United States Patent
Manninen

(10) Patent No.: US 9,297,440 B2
(45) Date of Patent: Mar. 29, 2016

(54) SEAM FOR AN INDUSTRIAL FABRIC AND SEAMING ELEMENT THEREFOR

(75) Inventor: Allan Manninen, Stittsville (CA)

(73) Assignee: AstenJohnson, Inc., Charleston, SC (US)

( * ) Notice: Subject to any disclaimer, the term of this patent is extended or adjusted under 35 U.S.C. 154(b) by 657 days.

(21) Appl. No.: 13/265,593

(22) PCT Filed: Apr. 16, 2010

(86) PCT No.: PCT/CA2010/000573
§ 371 (c)(1),
(2), (4) Date: Oct. 21, 2011

(87) PCT Pub. No.: WO2010/121360
PCT Pub. Date: Oct. 28, 2010

(65) Prior Publication Data
US 2012/0040150 A1    Feb. 16, 2012

(30) Foreign Application Priority Data

Apr. 21, 2009    (GB) .................................... 0906834.7
Nov. 13, 2009    (CA) ...................................... 2685623

(51) Int. Cl.
*D21F 1/12*        (2006.01)
*D21F 7/10*        (2006.01)
(Continued)

(52) U.S. Cl.
CPC ................ *F16G 3/09* (2013.01); *D21F 1/0054* (2013.01); *B29C 65/562* (2013.01); *B29C 66/1142* (2013.01); *B29C 66/43* (2013.01); *B29C 66/729* (2013.01); *B29K 2313/00* (2013.01);
(Continued)

(58) Field of Classification Search
None
See application file for complete search history.

(56) References Cited

U.S. PATENT DOCUMENTS 2,228,926 A    1/1941    Matthaei et al.
3,283,388 A *    11/1966    Kelleher et al. .................. 28/141
(Continued)

FOREIGN PATENT DOCUMENTS

DE          10029571 A1 *    1/2002    ................ F16G 3/02
DE      102004061226 A1    6/2006
(Continued)

OTHER PUBLICATIONS

C. Tintel, Stabilization of Poly(Ethylene Terephthalate) (PET) Against Hydrolysis by Carboxyl End Group Capping, 1998 (no month), pp. 64-68.*
(Continued)

*Primary Examiner* — Jeff Vonch
(74) *Attorney, Agent, or Firm* — Christopher & Weisberg, P.A.

(57) ABSTRACT

A seaming element for seaming industrial textiles for filtration or other uses, an industrial textile with seaming elements, and a method of seaming such textiles. The seaming element is secured to a first seamable end or edge of the fabric, and includes at least one extension member, which can be a channelled protrusion, and which is engageable with a corresponding at least one extension member of a corresponding seaming element secured to the second seamable end or edge. The seaming elements are configured and dimensioned so that when the extensions or protrusions of the two seaming elements are aligned together and engaged, in some embodiments being secured by a pintle, they have a thickness which is compatible with the caliper of the finished fabric, to form a secure seam while avoiding or minimizing any discontinuity or irregularity in the finished fabric.

43 Claims, 21 Drawing Sheets

(51) Int. Cl.
*F16G 3/00* (2006.01)
*F16G 3/09* (2006.01)
*D21F 1/00* (2006.01)
B29C 65/56 (2006.01)
B29C 65/00 (2006.01)

(52) U.S. Cl.
CPC .. *D21F 1/12* (2013.01); *D21F 7/10* (2013.01); *F16G 3/00* (2013.01); *Y10S 162/904* (2013.01); *Y10T 24/1608* (2015.01); *Y10T 428/19* (2015.01); *Y10T 428/192* (2015.01); *Y10T 428/2419* (2015.01); *Y10T 428/24198* (2015.01); *Y10T 428/24273* (2015.01); *Y10T 428/24355* (2015.01); *Y10T 428/24479* (2015.01); *Y10T 428/24752* (2015.01); *Y10T 428/24777* (2015.01); *Y10T 428/24802* (2015.01); *Y10T 442/181* (2015.04); *Y10T 442/60* (2015.04)

(56) References Cited

U.S. PATENT DOCUMENTS

| | | | |
|---|---|---|---|
| 3,972,105 A * | 8/1976 | Miller et al. | 29/283 |
| 3,998,986 A * | 12/1976 | Williams | 428/102 |
| 4,290,209 A | 9/1981 | Buchanan et al. | |
| 4,344,209 A * | 8/1982 | Harwood | 24/31 R |
| 4,418,726 A * | 12/1983 | Josef et al. | 139/383 AA |
| 5,092,373 A | 3/1992 | Lee | |
| 5,542,527 A * | 8/1996 | Jakob | 198/844.2 |
| 5,697,491 A * | 12/1997 | Alex | 198/846 |
| 5,746,257 A | 5/1998 | Fry | |
| 5,820,959 A * | 10/1998 | Whittaker | 428/61 |
| 6,328,079 B1 | 12/2001 | Zils | |
| 7,005,041 B2 | 2/2006 | Best | |
| 7,381,306 B2 | 6/2008 | Best et al. | |
| 2005/0181168 A1* | 8/2005 | Barnes | A41D 27/245 428/57 |
| 2006/0010932 A1* | 1/2006 | Morton | 66/202 |
| 2006/0016571 A1* | 1/2006 | Silakoski | 162/358.2 |
| 2007/0163667 A1* | 7/2007 | Crook | 139/387 R |
| 2007/0235154 A1* | 10/2007 | Perrin et al. | 162/358.2 |
| 2009/0139600 A1* | 6/2009 | Best | D21F 7/083 139/383 AA |
| 2009/0266686 A1* | 10/2009 | Lechner | 198/844.2 |
| 2010/0024178 A1* | 2/2010 | Hansen | B29C 65/1677 28/100 |
| 2010/0236034 A1* | 9/2010 | Eagles et al. | 28/100 |

FOREIGN PATENT DOCUMENTS

| | | | | |
|---|---|---|---|---|
| GB | 2288650 A | * | 10/1995 | F16G 3/02 |
| SU | 1805244 A1 | * | 3/1993 | F16G 3/00 |
| WO | WO9634146 A1 | | 10/1996 | |

OTHER PUBLICATIONS

English Abstract for SU 1805244 A1, Mar. 1993.*
Machine Translation for SU 1805244 A1, Mar. 1993.*
Sambale Harald, Higher Strengths When Welding with an Intermediate Layer, Jun. 2007.*
International Search Report and Written Opinion dated Jul. 13, 2010 for International Application Serial No. PCT/CA2010/000573, International Filing Date: Apr. 16, 2010 consisting of 6 pages.

* cited by examiner

SEAM FOR AN INDUSTRIAL FABRIC AND SEAMING ELEMENT THEREFOR

CROSS-REFERENCE TO RELATED APPLICATIONS

This application is a §371 of International Application No: PCT/CA2010/000573, filed Apr. 16, 2010, which application claims priority to GB Application No: 0906834.7, filed Apr. 21, 2009, and Canadian Application No: 2,685,623, filed Nov. 13, 2009, the entirety of all of which are incorporated herein by reference.

FIELD OF THE INVENTION

This invention relates to seaming of woven industrial fabrics, in particular to seaming elements for attachment to ends or edges of such fabrics, to enable the joining of those ends or edges in a seam. More particularly, the invention relates to seaming elements for use in a pair by being attached separately to one of two opposed edges of the fabric to be seamed together, such that thereafter the pair of seaming elements can be brought together and attached to each other to form a secure seam compatible with the intended end use of the fabric.

BACKGROUND OF THE INVENTION

Various methods are known and used for seaming woven industrial fabrics. These methods include several different methods of creating loops in yarns which would otherwise end at the end or edge of the fabric to be seamed, and connecting the loops of one end or edge to the opposing end or edge, either by inserting a coil through the loops to form a coil seam, or by interdigitating the loops to form a passage through which a pintle is inserted to form a pin seam. To create the loops, ends of selected yarns are conventionally woven back individually into the fabric to a sufficient distance to be secure, and may be further secured by stitching or other known means. These methods suffer from several disadvantages, including the time taken to perform the step of making the loops, and difficulties associated with ensuring sufficient seam strength, while at the same time maintaining compatibility of the characteristics of the fabric at the seam area and in the general fabric body.

It has now been found that it is possible to provide a pair of compatible seaming elements to a fabric, by attaching one of the pair of seaming elements to each of two opposing end regions or edges of a fabric to be seamed, in a simple, economical, and secure manner, such that when the end regions or edges are brought together, protrusions on the free outer edges of the pair of seaming elements can be attached to each other to form a secure seam, either by the connection of the protrusions per se, or by linking the protrusions in such manner as to provide a channel through which an additional seaming means such as a pintle can be inserted to secure the connection.

It has been found that the seaming elements can be attached by welding or other secure joining methods to the end regions of individual yarns of a woven fabric, or a fabric comprising yarns which are not interwoven, at the fabric end or edge to be seamed, either by securing selected yarns to outer surfaces of a seaming element, or securing selected yarns to inner surfaces within a seaming element, and that the seaming elements can be constructed in dimensions which are compatible with the overall fabric thickness so as to avoid or substantially minimize any difference in thickness at the seam area in comparison with the thickness of the fabric body.

Suitable protrusions can be provided either as single curved or angled protrusions from the free outer edge across the entire length of each seaming element, or as a set of individual channelled protrusions interspaced with notches or other spaces on each of a pair of the seaming elements, such that the sets can be interdigitated, and the channels through each protrusion aligned to define a single channel into which a pintle can be inserted and secured.

Further, it has been found that the seaming element can advantageously be constructed as an elongate body which can be provided either as a set of units interconnected at their lateral edges, or as a single integrally constructed body, in either case having a resultant length corresponding to the intended seam length.

It has further been found that the seaming elements can advantageously be used for non-woven fabrics which do not comprise yarns, such as fabrics comprising one or more layers of film.

The seaming element and method of the invention can be used for seaming woven and non-woven industrial fabrics of many types, particularly, but not restricted to, those used for filtration purposes. More particularly, the seaming element and method of the invention are especially suitable for use with woven papermakers' fabrics. In some respects, some of the features of the invention are discussed below in relation to its use for papermaking fabric applications; however, it will be understood that the invention is not restricted to use with such fabrics, but will be found useful in relation to any woven industrial fabric for which seaming in the general manner described below is feasible and advantageous.

SUMMARY OF THE INVENTION

The fabrics of the invention, and the fabrics for which the seaming elements of the invention are suitable, include many types. In particular, such fabrics can be woven or non-woven, and can be constructed of a rectangular flat-woven sheet having the finished width for the intended end use application, so that the two ends can be joined across their width to provide an endless fabric; or they can be constructed from a plurality of fabric portions or sections of smaller dimensions than the required finished dimension, for example as relatively narrow strips, which can be spirally-wound or otherwise assembled, and mutually joined at their lateral edges, and in some constructions, also at their ends.

In the discussion below, the terms "seamable edge" and "seamable end", in relation to a fabric, refer to and include any extremity of the fabric in any direction which is required to be joined to any other portion of the fabric. Thus, a "seamable edge" will include, for example, the lateral edges of elongated strips which are joined in adjacent relationship along their edges; and a "seamable end" will include, but not be limited to, the ends of an elongated flat fabric where those ends are to be joined to each other to provide an endless fabric. Thus, the seamable edge or seamable end of a fabric can be oriented in the eventual machine direction (MD) for the intended end use, or in the eventual cross-machine direction (CD) of the fabric.

A "layer" in relation to a woven fabric will comprise interwoven MD and CD yarns, in any of the known constructions for industrial textiles of this type, such that the fabric can for example comprise a single layer, or multiple layers in a direction perpendicular to the eventual travel direction of the fabric in its intended use environment, and using different sets of yarns interwoven in distinct weave patterns for each layer.

Similarly, in relation to a non-woven fabric, a "layer" can comprise a set of aligned yarns connected to each other by a method other than weaving, or can comprise a substantially planar elongated sheet or film; and for such fabrics, a plurality of sheets or the like can be secured together to provide multiple layers in a direction perpendicular to the eventual travel direction of the fabric in its intended use environment.

In a first broad embodiment, the invention therefore seeks to provide a seaming element for seaming a first seamable edge of an industrial textile to a second seamable edge of the industrial textile, the industrial textile comprising at least one layer, each layer having first and second substantially planar surfaces, the seaming element being constructed and arranged to be affixed in a seaming position by being bonded to two of the substantially planar surfaces at least proximate the first seamable edge and comprising at least one elongate body having first and second ends, a first lateral edge region and a second lateral edge region, wherein
(i) the second lateral edge region is constructed and arranged to be bonded to the first seamable edge; and
(ii) the first lateral edge region comprises at least one extension member constructed and arranged to
  (a) define a longitudinal channel between the first end and the second end; and
  (b) extend from the first seamable edge when the seaming element is in the seaming position,
wherein the at least one extension member is engageable with the corresponding at least one extension member of a complementary seaming element affixed by bonding at the second seamable edge, such that the extension members are securably aligned together.

Preferably, as discussed further below, the seaming element is configured so that it has a thickness which is compatible with the caliper of the finished fabric in which it is intended to be used, so as to minimize any discontinuity or irregularity between the finished seaming area and the general fabric body.

The industrial fabric can be woven or non-woven. Where the industrial fabric is woven, or comprises a non-woven structure of yarns, each layer comprises one layer of interwoven or otherwise cooperating yarns, and the seaming element is constructed and arranged to be affixed in the seaming position by being bonded to surfaces of at least some of the yarns at and proximate the first seamable edge. In some of the variants of this embodiment of the invention, the seaming elements can be constructed and arranged either to be affixed between two layers of yarns, or to be affixed to outer surfaces of free ends of the yarns of one or more layers.

In some of the variants of this embodiment of the invention, the at least one extension member comprises a channeled protrusion along the first lateral edge region.

In a further broad embodiment, the invention seeks to provide a seaming element for seaming a first seamable edge of an industrial textile to a second seamable edge of the industrial textile, the industrial textile comprising at least one layer, each layer having first and second substantially planar surfaces, the seaming element being constructed and arranged to be affixed in a seaming position by being bonded to two of the substantially planar surfaces at and proximate the first seamable edge and comprising
(i) at least one elongate body having first and second ends, a first lateral edge region and a second lateral edge region; and
(ii) at least one channelled protrusion along the first lateral edge region;
wherein the at least one channelled protrusion is engageable with the corresponding at least one channelled protrusion of a complementary seaming element affixed by bonding at the second seamable edge, such that the protrusions are securably aligned together.

In this broad embodiment also, the industrial fabric can be woven or non-woven. Where the fabric is woven, or comprises a non-woven structure of yarns, each layer comprises one layer of interwoven or otherwise cooperating yarns, and the seaming element is constructed and arranged to be affixed in the seaming position by being bonded to surfaces of the yarns at and proximate the first seamable edge, and in some of the variants of this embodiment, the seaming elements can be constructed and arranged either to be affixed between two layers of yarns, or to be affixed to outer surfaces of free ends of the yarns.

In a further broad embodiment, the invention seeks to provide a seaming element for seaming a first seamable edge of a woven industrial textile to a second seamable edge, the industrial textile comprising sets of interwoven yarns, the seaming element being constructed and arranged to be affixed to at least one layer of the yarns by being bonded to surfaces of the yarns at and proximate the first seamable edge and comprising
(i) at least one elongate body having first and second ends, a first lateral edge region and a second lateral edge region; and
(ii) at least one channelled protrusion along the first lateral edge region;
wherein the at least one channelled protrusion is engageable with the corresponding at least one channelled protrusion of a complementary seaming element affixed by bonding at the second seamable edge, such that the protrusions are securably aligned together.

In this broad embodiment also, the industrial textile can be woven or non-woven. Where the industrial textile is a woven fabric, or comprises a non-woven structure of yarns, each layer comprises one layer of interwoven or otherwise cooperating yarns, and the seaming element is constructed and arranged to be affixed in the seaming position by being bonded to surfaces of the yarns at and proximate the first seamable edge, and in some of the variants of this embodiment, the seaming elements can be constructed and arranged either to be affixed between two layers of yarns, or to be affixed to outer surfaces of free ends of the yarns.

In some variants of this broad embodiment, the seaming element further comprises a longitudinal channel extending between the first and second ends and proximate the first lateral region, and a plurality of notches along the first lateral edge region and penetrating into the longitudinal channel; wherein
(i) the notches define the at least one channelled protrusion as a plurality of spaced-apart channelled protrusions;
(ii) the protrusions are engageable with protrusions of the corresponding seaming element by interdigitation to define a channel constructed and arranged to receive a seam securing means.

Preferably, the notches penetrate the elongate body to a distance from the first lateral edge region greater than a greatest distance of an innermost point in the longitudinal channel from the first lateral edge region. Preferably also, the longitudinal channel has a cross-sectional configuration selected from substantially circular and substantially elliptical, although other configurations, such as substantially rectangular, are possible.

Preferably, the longitudinal channel is constructed and arranged to receive a seam securing means comprising a pintle having a cross-sectional configuration selected from substantially circular and substantially elliptical.

Preferably the elongate body and the at least one channelled protrusion are integrally constructed; more preferably, each of the at least one channelled protrusion comprises a body having an internal bore and a reinforcement means provided at a location selected from within the internal bore and at least partly within the elongate body; and the elongate body, each of the at least one channelled protrusion, and the reinforcement means are constructed by a co-extrusion process.

In a further variant of the broad embodiments of the invention, the elongate body comprises only a continuous filamentary structure deformedly set in a configuration comprising a plurality of looped segments alternated with connecting portions, each connecting portion being configured to separate adjacent ones of the looped segments alternately into a first looped layer and a second looped layer, wherein (i) the second lateral edge region comprises at least part of each looped segment of the first layer and at least part of each looped segment of the second layer, each of the first looped layer and the second looped layer being constructed and arranged to be bonded to one of the substantially planar surfaces of the textile; and (ii) each of the plurality of extension members comprises one of the connecting portions.

In the broad embodiments of the invention, the seaming element can further comprise a covering layer applied at least to a portion of the elongate body. Preferably, the covering layer is an outer covering constructed and arranged to be securable to the elongate body. In some variants of the broad embodiments, the seaming element can further comprise an outer covering constructed and arranged to be securable to the elongate body and to the surfaces of the yarns. In this event, preferably the outer covering comprises a fibrous sheath substantially covering the elongate body including outer surfaces of each of the protrusions; more preferably, the fibrous sheath is constructed of at least one helically wound fiber or a braided sleeve. Where the seaming element is constructed and arranged to be affixed to polymer yarns, preferably the outer covering is constructed of at least one polymer material.

For most intended end uses of the fabrics to which the seaming elements of the invention are provided, preferably the secure alignment of the pairs of seaming elements will include the insertion of a pintle, in which case preferably the longitudinal channel is constructed and arranged to receive a pintle having a cross-sectional shape selected from circular, elliptical and rectangular. However, in some variants of the broad embodiments, the extension members are securely engageable with each other without the need for a pintle or similar securing means.

In the embodiments of the invention, the seaming element can comprise at least one layer of film, preferably comprising a material selected from a thermoplastic and a thermoset; preferably the material is a thermoplastic and is selected from hydrolysis stabilized PET, PEEK, PPS and PEN; or is a thermoset and comprises a polyimide.

As a further alternative, the seaming element can be constructed of a fabric selected from a woven fabric and a nonwoven fabric, in which case preferably the seaming element at least at its lateral edges comprises a hydrolysis resistant matrix.

As discussed further below, for most variants of the embodiments of the invention, each seaming element can be provided in a dimension to extend across the entire seamable edge of the fabric; alternatively, the seaming elements can be constructed and arranged to be secured in an adjacent plurality thereof, each being securable to an adjacent element by the provision to at least one of the first and second ends of at least one fastening means.

Preferably, for most variants of the embodiments of the invention, at least one of the first and second ends of the seaming elements comprises an enhanced wear-resistant region. Preferably, such enhanced wear-resistant region comprises at least one of a reinforcement material, a secondary material, and an extension member.

In some variants of the embodiments of the invention, preferably at least part of an outer surface of the seaming element is profiled; more preferably, the profiled surface comprises embossing.

In a further broad embodiment, the invention seeks to provide an industrial textile comprising two seaming elements according to the invention. The two seaming elements can have the same configuration as each other; but for some applications, preferably the two seaming elements have a different configuration from each other. Where the seaming elements are provided as a plurality of adjacent elements to each seamable edge, preferably the seaming elements provided to the first seamable edge will each have a first configuration, and the seaming elements provided to the second seamable edge will each have a second configuration, which may be different from the first configuration, but in each case constructed and arranged for compatible engagement with the seaming elements provided to the first seamable edge and having the first configuration, and to provide the appropriate channel if desired.

Where the industrial textile is a woven fabric, preferably the seaming elements are constructed and arranged to be secured by a pintle having a cross-sectional shape selected from circular, elliptical and rectangular, and constructed of a material selected from PET, PEN, PEEK, PPS, nylon and stainless steel.

The industrial textiles of the invention will be suitable for many intended end uses, but are particularly advantageous for use as papermakers fabrics. For such fabrics, the seaming elements may be provided in a machine direction of the fabric or in a cross-machine direction of the fabric.

Preferably, each seaming element is secured to the fabric by at least one of a laser weld, an ultrasonic weld, and an adhesive bond.

In a further broad embodiment, the invention seeks to provide a method of making a seam for an industrial textile having a first seamable edge and a second seamable edge, and comprising at least one layer, each layer having first and second substantially planar surfaces, the method comprising:

(a) providing a first and second seaming element each comprising an elongate body having first and second ends, a first lateral edge region and a second lateral edge region, and at least one extension member constructed and arranged to define a longitudinal channel between the first end and the second end, and to extend from the first seamable edge when the seaming element is in a seaming position;

(b) bonding at least part of the body of the first seaming element to two of the substantially planar surfaces at least proximate the first seamable edge such that the at least one extension member extends outwardly from the first seamable edge;

(c) bonding at least part of the body of the second seaming element to two of the substantially planar surfaces at least proximate the second seamable edge such that the at least one extension member extends outwardly from the second seamable edge; and (d) bringing the at least one extension member of the first seaming element into engaged alignment with the at least one extension member of the second seaming element and securing the two seaming elements together.

For applications where it is important to avoid discontinuity between the seaming element and the fabric, the thickness of the seaming element should not be greater than the caliper of the fabric. Thus, in a variant of this broad embodiment, the invention seeks to provide a method of making a seam for an industrial textile having a first seamable edge and a second seamable edge, and comprising at least one layer, each layer having first and second substantially planar surfaces and a finished caliper C, the method comprising:

(a) providing a first and second seaming element each comprising an elongate body having first and second ends in an X direction, a first lateral edge region and a second lateral edge region in a Y direction, and a thickness T in a Z direction which is selected from substantially equal to C and less than C, and at least one extension member constructed and arranged to define a longitudinal channel between the first end and the second end; and extend from the first seamable edge when the seaming element is in a seaming position;

(b) bonding at least part of the body of the first seaming element to two of the substantially planar surfaces at least proximate the first seamable edge such that the at least one extension member extends outwardly from the first seamable edge;

(c) bonding at least part of the body of the second seaming element to two of the substantially planar surfaces at least proximate the second seamable edge such that the at least one extension member extends outwardly from the second seamable edge; and (d) bringing the at least one extension member of the first seaming element into engaged alignment with the at least one extension member of the second seaming element and securing the two seaming elements together.

In a further embodiment, the invention further seeks to provide a method of making a seam for a woven industrial textile having a first seamable edge and a second seamable edge, the method comprising:

(a) providing a first and second seaming element each comprising an elongate body having first and second ends, a first lateral edge region and a second lateral edge region, and at least one channelled protrusion;

(b) bonding at least part of the body of the first seaming element to surfaces of yarns at and proximate the first seamable edge such that the at least one channelled protrusion extends outwardly from the first seamable edge;

(c) bonding at least part of the body of the second seaming element to surfaces of yarns at and proximate the second seamable edge such that the at least one channelled protrusion extends outwardly from the first seamable edge; and (d) bringing the at least one channelled protrusion of the first seaming element into engaged alignment with the at least one channelled protrusion of the second seaming element and securing the two seaming elements together.

For applications where it is important to avoid discontinuity between the seaming element and the fabric, the thickness of the seaming element should not be greater than the caliper of the fabric. Thus, in a variant of this embodiment, the invention seeks to provide a method of making a seam for a woven industrial textile having a first seamable edge and a second seamable edge and a finished caliper C, the method comprising:

(a) providing a first and second seaming element each comprising an elongate body having first and second ends in an X direction, a first lateral edge region and a second lateral edge region in a Y direction, and a thickness T in a Z direction which is selected from substantially equal to C and less than C, and at least one channelled protrusion;

(b) bonding at least part of the body of the first seaming element to surfaces of yarns at and proximate the first seamable edge such that the at least one channelled protrusion extends outwardly from the first seamable edge;

(c) bonding at least part of the body of the second seaming element to surfaces of yarns at and proximate the second seamable edge such that the at least one channelled protrusion extends outwardly from the first seamable edge; and (d) bringing the at least one channelled protrusion of the first seaming element into engaged alignment with the at least one channelled protrusion of the second seaming element and securing the two seaming elements together.

In each of the embodiments of the methods of the invention, preferably the method comprises providing first and second seaming elements constructed according to the embodiments of the inventive seaming elements.

The seaming elements provided to the two seamable edges can have substantially the same configuration, or the element or elements provided to the first seamable edge can have a complementary different configuration from that of the element or elements provided to the second seamable edge.

For the methods of the invention, preferably T is selected in step (a) to have a value which is between 40% and 90% of a value of C, more preferably between 60% and 75% of a value of C, where the seaming elements are secured between two layers of yarns of a woven fabric. Alternatively, where the seaming elements are secured to outer surfaces of free ends of yarns of a woven fabric, preferably T is substantially equal to a value of C.

Advantageously, where the industrial textile is a woven fabric, before bonding of the seaming element to the respective seamable edge, preferably the free ends of the yarns are compressed into a compressed position and the free ends of the yarns selectively cut across the seamable edge to provide a uniform edge, and the bonding is performed while retaining the yarns in the compressed position.

Preferably, the securing of the seaming elements together comprises inserting a pintle through the engaged extension members or channelled protrusions. Preferably, the pintle has a cross-sectional shape selected from circular, elliptical and rectangular, and constructed of a material selected from PET, PEN, PEEK, PPS, nylon and stainless steel.

Where the industrial textile is a woven fabric and the seaming element is to be inserted between layers of warp yarns, advantageously the bonding is performed during the weaving of the fabric. Preferably, the bonding is performed by at least one of welding and application of an adhesive, more preferably either by laser welding, or by application of an adhesive selected from an epoxy and a silicone adhesive.

The seaming element of the invention is particularly suitable for use in joining the ends of a woven industrial fabric utilizing polymeric monofilament warp yarns, particularly where those yarns have a generally rectangular or flattened cross-sectional shape, such as the fabrics taught and described in U.S. Pat. No. 4,290,209 or U.S. Pat. No. 5,092,373, and continuations and divisionals thereof. For fabrics of this nature, one of a pair of seaming elements of the invention is welded or otherwise securely joined to a fabric end to be joined, and a second seaming element of the pair is welded or otherwise securely joined to the other fabric end to be joined. The two opposed fabric ends are then brought together, and the two members of the pair of seaming elements are joined, thereby securely joining the opposed fabric ends.

The seaming element of the invention is a seaming element having an elongate body, an outer first lateral edge region provided with at least one protrusion for joining a pair of seaming elements together, and an inner second lateral edge region. Where the seaming element is configured to be inserted between layers of warp yarns of a woven fabric, or a non-woven fabric comprising warp yarns, so that the warp yarns are secured to outer surfaces of the seaming element, at least the inner second lateral edge region is preferably semi-circular or elliptical in cross-section, and the outer first lateral edge region can also be curved, but the solid body portion between the edge regions preferably has a generally rectangular cross-sectional configuration. Where the seaming element is configured so that ends of warp yarns are secured to inner surfaces of the seaming element, or where the fabric is a non-woven fabric not comprising yarns, the seaming element is preferably constructed with a generally U-shaped cross-section, wherein the curve of the U, or an extension to the curve, will form or support the protrusion for connection with the protrusion of a corresponding seaming element.

Where the seaming element is configured to be inserted between layers of warp yarns of a woven fabric, the elongate body, which can be made as a single body or as a set of interlockable smaller bodies, is preferably constructed as a plastic extrusion. The protrusions are either formed as part of the extruded body and of the same material, or can be of a different material and embedded or otherwise secured into the elongate body itself. However, where the seaming element is configured to enclose the end of a non-woven fabric or the ends of warp yarns of a woven fabric, either as a single seaming element or a set of interconnectable smaller seaming elements, it is preferably constructed of one or more layers of a film, or as a continuous filamentary structure. This can be of any material which is suitable for the intended end use environment, and which is compatible with the materials of the fabric yarns. However, where the seaming element is to be secured to the yarns by laser welding, it must have suitable optical properties so as to be transparent to the incident laser radiation, and for this aspect, a hydrolysis stabilized PET is particularly suitable. A thin layer of laser energy absorbent film can be provided to the interior of the seaming element, or the yarn ends can be coated, as discussed further below. In instances where it is not practical to laser weld a seaming element comprised of a thermoplastic film material such as PET to the yarn ends, it is also possible to use a thermoset plastic film. Thermosets are not amenable to laser welding, and so must be secured in place by means of an appropriate adhesive or other bonding method. Thermoset films which may be suitable for this purpose include commercially available polyimides which are sold in the marketplace under the tradenames Apical™, Kapton™, UPILEX™, VTEC PI™, Norton TH™ and Kaptrex™; others may be suitable.

Where the seaming element is configured as a single body, it can be provided with fracture points, so that if as a result of wear the seam begins to fail at one location, the seaming element will fracture at the adjacent fracture points, without failure of the entire seam.

As a further option, the seaming element can be constructed of a fabric, either woven or non-woven, and formed into a U-shape, preferably with encapsulation of at least the edges in a hydrolysis resistant matrix. Further options for the seaming element include the use of a strip of oriented film which is spiralled to form a tube, then slit and cut into a suitable configuration; or combinations of film and fabric. Where several layers of film are used, they can be joined by any suitable means compatible with the intended end use environment, such as epoxy or other adhesives, heat and pressure, ultrasonic welding.

In the embodiments where the seaming element is configured as a U-shaped seaming element to enclose the end of a non-woven fabric or the ends of warp yarns of a woven fabric, the protrusions and spaces are preferably formed by a suitable cutting method, such as die, laser or water jet cutting.

As noted above, in some embodiments the protrusions are configured as a continuous member across the full length of the outer first lateral edge, and to be channelled to interlock with and be secured to each other directly, or to be interlocked in a manner which defines a channel into which a pintle can be inserted. In other embodiments, the protrusions comprise a plurality of spaced apart seaming elements, each configured with a channelled portion, such that when interdigitated with the protrusions of an opposing seaming element, they together define a hollow channel or passageway to receive a pintle. In some embodiments, the outer first lateral edge of the seaming element can have a concave aspect to contribute to the configuration of the channel.

In each of the embodiments of the invention, at the sides of the seaming element which will be at the outside edges of the fabric when in its operating environment, it will generally be advantageous to provide an area of greater durability to withstand the harsher physical conditions at that region in most filtration processes. As the fabric will be somewhat wider across the machine than the sheet being carried, the edges of seaming elements at the outer edges the fabric, i.e. where the seaming elements do not contact the sheet being carried on the fabric, can include reinforcements, or be made of a different material or combination of materials, or have an extension in the machine direction, without any adverse effect on the quality of the sheet.

Where the seaming element is configured as an extrusion to be inserted between layers of warp yarns of a woven fabric, or a non-woven fabric comprising yarns, it is preferably constructed of a thermoplastic or thermoset polymer suitable for use in industrial textiles, such as PET, PPS and the like, as well as polyimides and similar thermosets. The length of the seaming element is preferably reinforced by means of a covering, which is preferably a fibrous sheath or sleeve comprised of either successive helical turns of one or more continuous fibers, or a braided sleeve. The fibrous sheath is preferably comprised of fine fibers formed from a strong, hydrolysis or heat resistant material such as Nomex™, Kevlar™, PPS, PEEK, stainless steel or the like. The sheath configuration, dimensions and materials are selected so as to impart sufficient additional strength and rigidity to the seaming element so that it is capable of withstanding stresses imposed by the fabric across its length dimension, depending on the intended end use of the fabric, and the operational environment which will be acting on the seam area. The sheath and seaming element together can be further encapsulated with a coating of a polymer such as PET, selected to be compatible with the polymer from which the fabric yarns are constructed, so as to allow for welding the seaming element in position.

Where the seaming element is a continuous filamentary structure, it can be constructed of any fiber forming plastic material which is suitable for use as a monofilament, and is compatible with the material to which it will be bonded. Thus where a filamentary seaming element is intended for use with a fabric comprising PET warp yarns, the seaming element would preferably be constructed of PET. Similarly, the filament can comprise other materials, subject to the factors discussed above in relation to the materials of construction for the seaming elements of the invention in general.

In the embodiments in which the protrusions are provided as a plurality of spaced-apart elements, these can be configured by notching the protrusion area, either an embedded protrusion member, or the outermost portion of the extruded seaming element. In either case, the notching provides indentations and land areas along the outer first lateral edge region, dimensioned so as to fit into one another and be mutually engageable by interdigitation, to define the appropriate channel to receive a pintle.

The seaming element in the embodiments of the invention is selected and installed as follows. Firstly, the configuration of the seaming element is selected depending on the intended end use of the fabric; and as discussed further below, the thickness is selected so as to avoid or minimize any discontinuity or irregularity between the finished seaming area and the general fabric body. For some intended end uses, as noted above and as discussed in more detail below with reference to the drawings, it can be particularly advantageous to provide for the two elements (or sets where each seamable edge is provided with a plurality of adjacent elements) to have different but complementary configurations.

For seaming two ends of a fabric, in a cross-machine direction seam, and where the seaming element is configured to be inserted between layers of warp yarns of a woven fabric, the seaming element can be installed when the fabric is still on the loom, or after it has been removed. For installation on the loom, where the seaming elements are to be secured between two layers of yarns, an assembled pair is inserted within the weave at the appropriate location, and the warp yarns appropriately secured, for example by welding, to the respective members of the pair. The warp yarns can then be cut to complete the seaming area construction.

For installation off the loom, again in a cross-direction seam, the fabric is cut at each opposing end adjacent a selected weft yarn to provide a straight fabric end; one or more weft yarns are removed to create an opening between the fabric warp yarns into which the seaming element can be inserted. The length of the seaming element, either as a single body or a plurality of interconnected bodies, will normally be the same as the width of the fabric end into which it is to be inserted and along which end the seam is to be formed. The seaming element is positioned in between the warp yarns at the fabric edge so that the protrusions are exposed and the inner second lateral edge region is oriented towards the interior of the fabric. The seaming element is then welded into place to surfaces of the individual warp yarns using a laser, ultrasonics, a heat source, adhesives or other suitable energy or chemical delivery means. Each fabric warp yarn in contact with the solid side of the seaming element is thus welded to the outer surface of the seaming element, either directly to the body, or to the sheath which is preferably affixed to the outer surface of the body. The warp yarns are welded or attached so as to be in contact with at least 50% of the seaming element surface and preferably cover 100% of the main body portion of the seaming element.

In the embodiments where the seaming element is configured as a U-shaped seaming element to enclose the ends of warp yarns of a woven fabric, the ends of the fabric are prepared by the removal of selected weft yarns. The yarn ends can be inserted into the seaming element by any suitable means, but preferably the free ends of the warp yarns are compressed, trimmed if necessary, and preferably retained in a compressed position for insertion into the seaming element, and then secured in place. To facilitate accurate placement of the yarn ends, a removable spacer element can first be inserted within the seaming element, i.e. within the U portion of the seaming element, such that after securing of the yarns by the selected method, the spacer element can be removed, leaving an internal channel in the seaming element having suitable dimensions to later receive the intended size and shape of pintle.

Alternatively, a pair of seaming elements can be connected together before being secured to the fabric, by bringing their respective outer edges together, inserting a pintle or other spacing element into the channel, and then installing the seaming elements at the respective fabric ends or edges.

Once seaming elements have been welded or otherwise secured in place at each fabric end, the two ends are brought together so that the land areas of one seaming element can be inserted into the indentations of the opposite seaming element. A pintle or similar joining means is then inserted along the hollow channel in between the land areas and indentations, thereby closing the fabric ends together and rendering the fabric endless. For such seams, preferably the pintle will have a substantially circular cross-section, but other configurations could also be used, depending on the intended end use of the fabric.

For seaming lateral edges of a woven fabric, i.e. in a machine direction (MD) seam, the seaming element is preferably configured to surround exposed ends of the weft yarns, i.e. by welding inner surfaces of the protrusions to those yarns, adjacent to the warp yarns closest to the fabric edges. For such applications, it will generally be advantageous to configure the seaming element to receive a pintle having an elliptical cross-section, to provide greater rigidity for the seam area, but other configurations could also be used.

In situations where the seaming element of the invention is to be installed between the warp yarns of a woven fabric so as to create a cross-machine direction (CD) oriented seam, the thickness of the seaming element is most preferably equal to the fabric caliper (thickness or Z-direction dimension) less two times the warp thickness (or vertical dimension), so that the finished thickness at the seam area after seaming will be as close as possible to equal that of the general fabric body, to eliminate any irregularities which can adversely affect the characteristics of a sheet product carried on the fabric, for example in papermaking applications. Papermakers' dryer fabrics, for which the use of the seaming elements of the invention are particularly suitable, are generally woven with flat warp yarns, so that the thickness dimension for a seaming element to be installed between the warp yarns can readily be calculated.

For example, where a dryer fabric has a conventional finished caliper of between 1.3 mm and 1.8 mm, and is woven with warp yarns having a thickness of 0.25 mm, for a seaming element to be installed between layers of warp yarns, the thickness would preferably be between 0.8 mm (1.3−0.5) and 1.3 mm (1.8−0.5). As a percentage of the fabric caliper, the seaming element thickness would be $(0.8/1.3 \times 100) = 62\%$ to $(1.3/1.8 \times 100) = 72\%$.

Thus for seaming elements of the invention which are intended to be installed between two layers of yarns, the thickness is preferably between approximately 40% and 90% of the caliper of the finished fabric. However, where the seaming element is to be affixed to outer surfaces of yarns of the fabric, in most cases the seaming element thickness will preferably be substantially 100% of the caliper of the finished fabric.

BRIEF DESCRIPTION OF THE DRAWINGS

The invention will now be described with reference to the drawings, in which.

DETAILED DESCRIPTION OF THE DRAWINGS

Figure 1:
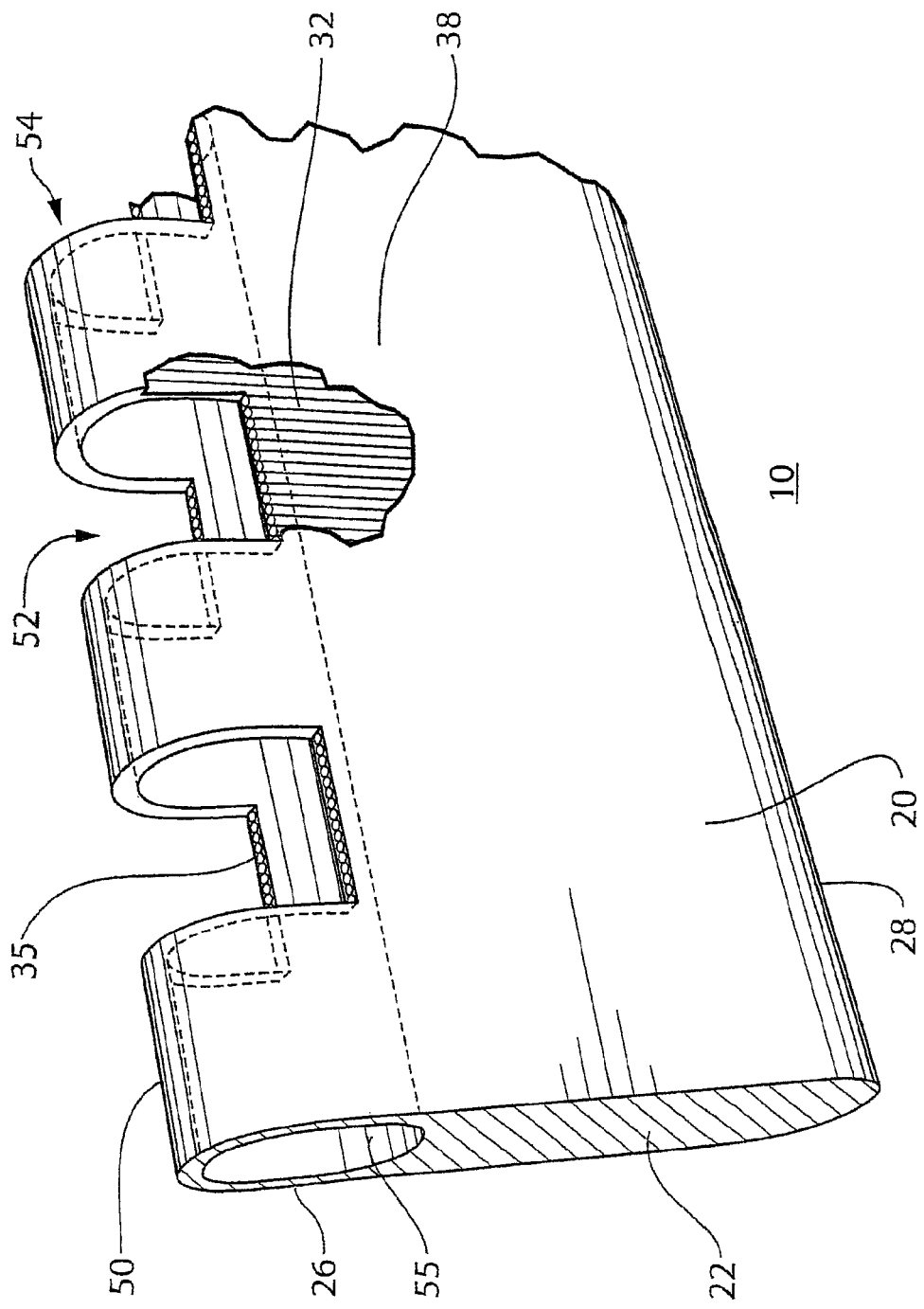
FIG. 1 is a perspective view of a seaming element in a first embodiment of the invention.
Figures 2, 3:
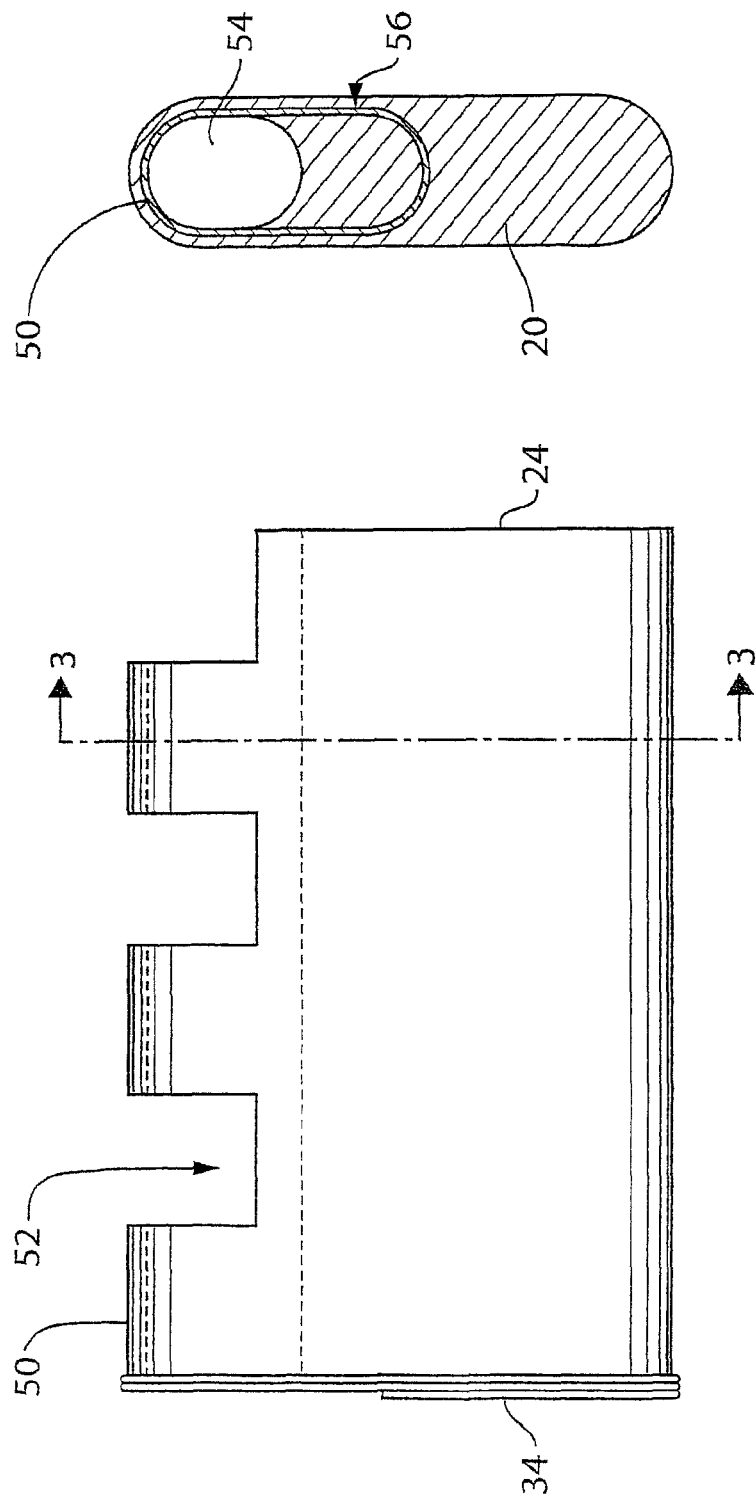
FIG. 2 is a top view of the seaming element of FIG. 1.
FIG. 3 is a sectional view taken along the lines 3-3 in FIG. 2.
Figure 8:
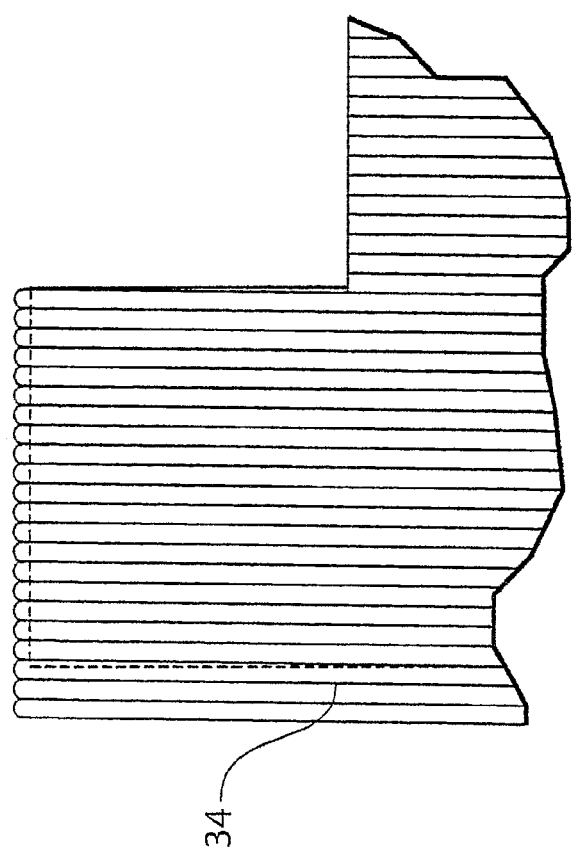
FIG. 8 is an enlarged partial view of a reinforcement covering applied to an embodiment of the invention.

Referring first to FIGS. 1, 2 and 3, a first embodiment of the invention is shown. A seaming element 10 has an elongate body 20, with a first end 22 and a second end 24, a first lateral edge region 26 and a second lateral edge region 28. The first lateral edge region 26 is provided with a set of channelled protrusions 50, spaced apart by notches or spaces 52, and defining a channel 54, which in this embodiment extends into the body 22 in a concave region 55. The body 20 and the protrusions 50 are provided with a sheath 32, for example wrapped yarns 34 (shown in an enlarged view in FIG. 8), which are secured to the body by a coating 38, which is selected to be compatible with the material of construction of the yarns of the fabric to which the seaming element is intended to be affixed. The yarns 34 are suitably cut at the edges of the notches 52, and the process of securing the yarns 34 to the body 20 also includes the cut ends 35. The protrusions 50 can be provided with reinforcement, for example where the seaming element is made by extrusion, a reinforcement 56 as shown in FIG. 3 can be provided as a co-extrusion. Alternatively, an insert (not shown) can be secured within the inner perimeter of the channel 54.

Figure 5:
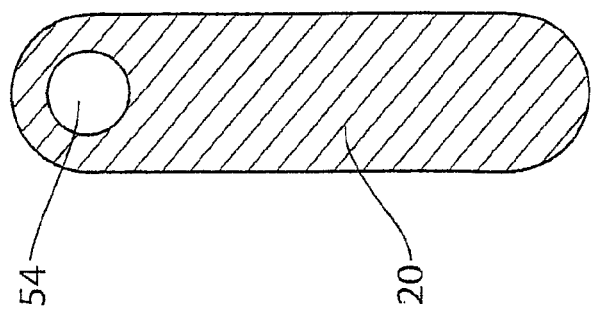
FIG. 5 is a sectional view taken along the lines 5-5 in FIG. 4.
Figure 4:
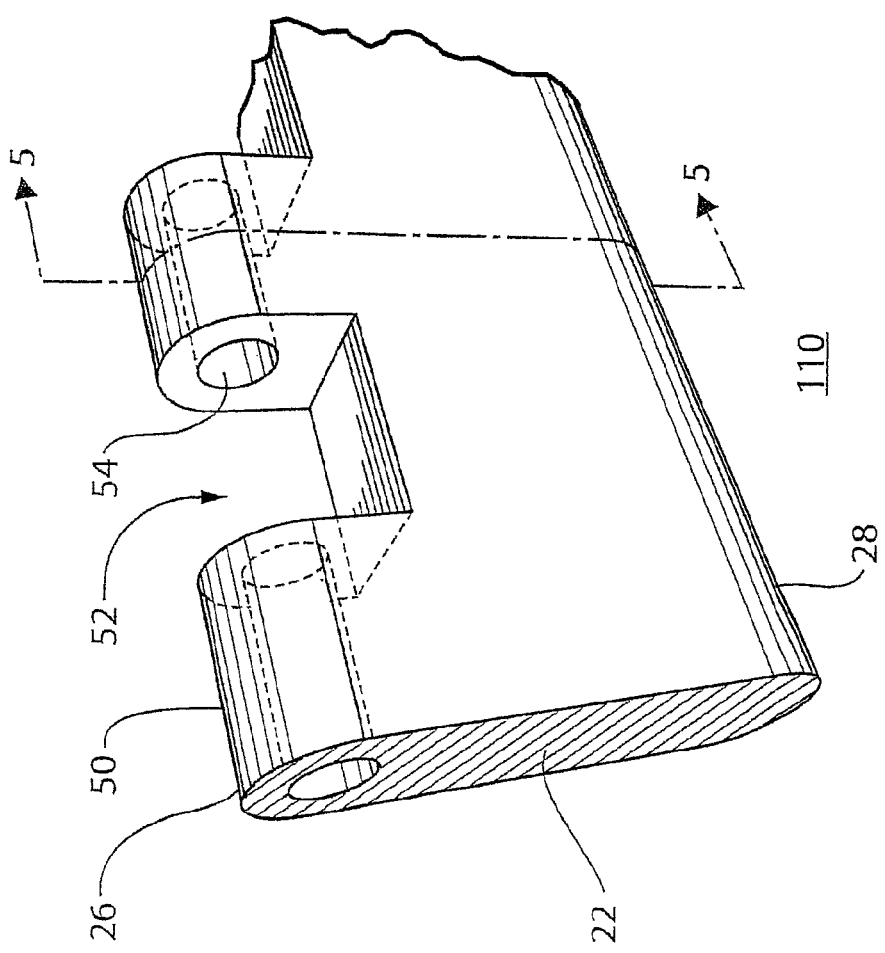
FIG. 4 is a perspective view of a seaming element in a second embodiment of the invention.

Referring now to FIGS. 4 and 5, an alternative embodiment of a seaming element 110 of the invention is shown, in which the channel 54 is provided within the protrusions 50 and does not extend into the body 20.

The channel 54 is shown as elliptical in FIGS. 1 to 3, and circular in FIGS. 4 and 5; but any suitable cross-sectional configuration can be selected, depending on the intended end use of the seaming element, including the preferred configuration for any securing means to be inserted in the channel 54 to secure two of the seaming elements together, as described further below. It has been found that a substantially circular cross-section pintle is generally preferable for a cross-machine direction seam, whereas an elliptical cross-section pintle provides greater rigidity and is therefore generally preferable for a machine direction seam.

Figure 6:
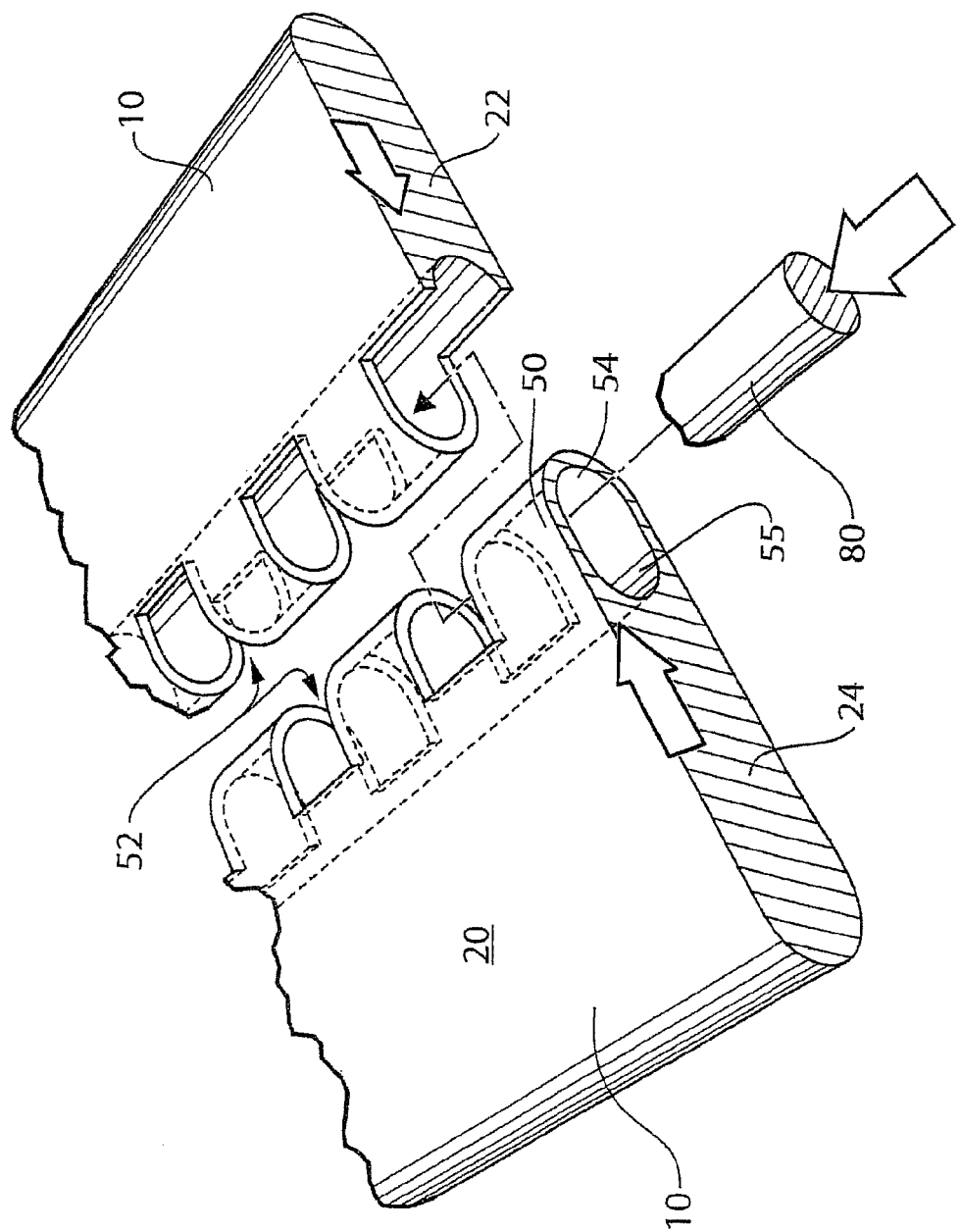
FIG. 6 is a perspective view showing the connecting of a pair of the seaming elements of FIG. 1.
Figure 7:
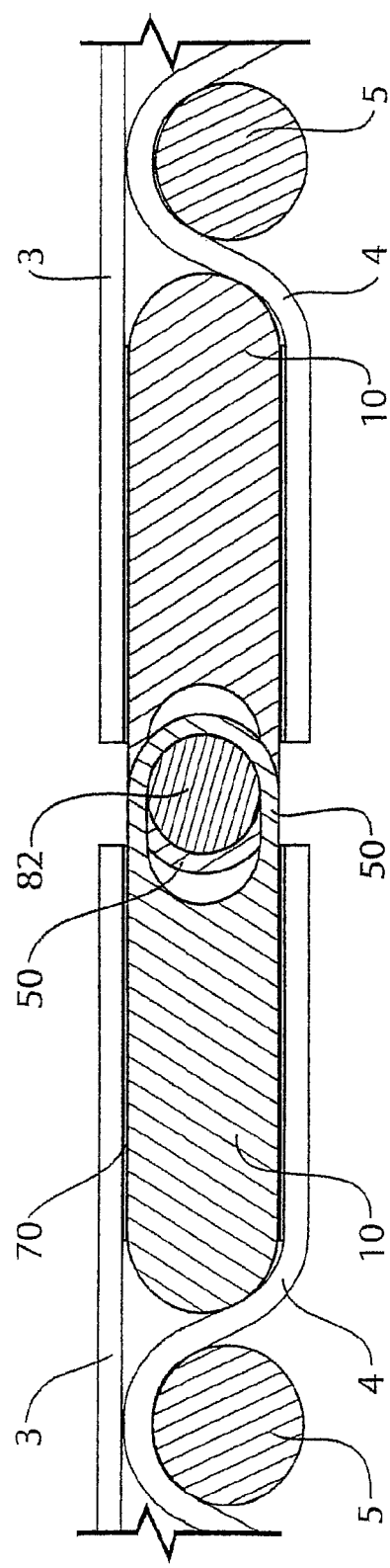
FIG. 7 is a cross-sectional view of two seaming elements of the invention in a mutually connected position and secured to a fabric.

Referring now to FIGS. 6 and 7, the use of the seaming elements to close a seam at fabric ends or edges can be seen. As shown in FIG. 7, a first seaming element 10 is inserted between a layer of upper warp yarns 3 and a layer of lower warp yarns 4, at the first end or edge to be seamed. The seaming element 10 is secured between the layers adjacent to weft yarn 5, such that protrusion 50 extends beyond the cut ends of warp yarns 3 and 4. The seaming element 10 is secured to the warp yarns 3 and 4 by suitable means, such as welds 70. A second seaming element is inserted correspondingly in the second end or edge to be seamed to the first end or edge. Then, as can be seen from FIG. 6, the two seaming elements 10 can be brought together so that the protrusions 50 of the first seaming element 10 are received in the notches 52 of the second seaming element 10; and the protrusions 50 of the second seaming element 10 are received in the notches 52 of the first seaming element 10. When the protrusions 50, and the channels 54, are aligned, a seam securing means such as pintle 80 can be inserted through the combined channel 54, to secure the two seaming elements 10 together, in the finished position shown in FIG. 7.

As can be seen from FIG. 7, for installation between two layers of warp yarns, the preferred thickness of the seaming element 10 is less than the caliper of the finished fabric, to avoid or minimize any discontinuity or irregularity between the finished seaming area and the general fabric body. Most preferably, that thickness will have a value substantially equal to the caliper minus twice the thickness of the individual warp yarns.

Figure 9:
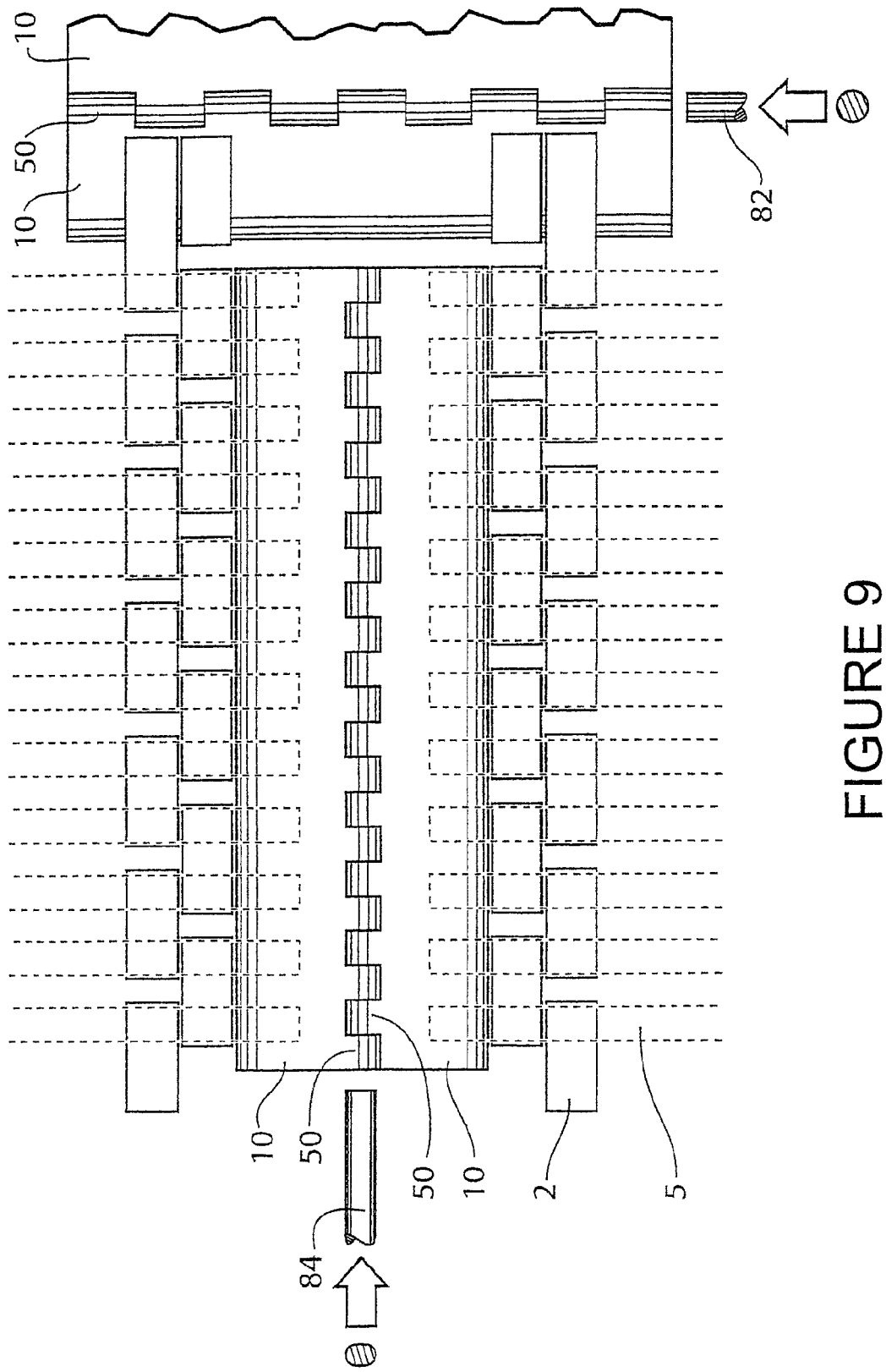
FIG. 9 is a top view showing embodiments of the invention secured to a fabric and in a mutually connected position, applied to a cross-machine direction or end seaming area and a machine direction or edge seaming area.

As discussed previously, the seaming elements of the invention can be used in cross-machine direction seams or machine direction seams. FIG. 9 shows an example of embodiments of the invention in position for each of these types of seams. Thus, the two seaming elements 10 at the right hand side of the figure are in position and secured to warp yarns 2 in a cross-machine direction seam for two ends of a fabric, ready to receive the circular cross-section pintle 82 through the aligned channels in the protrusions 50. The two seaming elements 10 from right to left across the figure are secured to weft yarns 5 in a machine direction seam for two edges of a fabric, and ready to receive the elliptical cross-section pintle 84 through the aligned channels in the protrusions 50.

Figure 10:
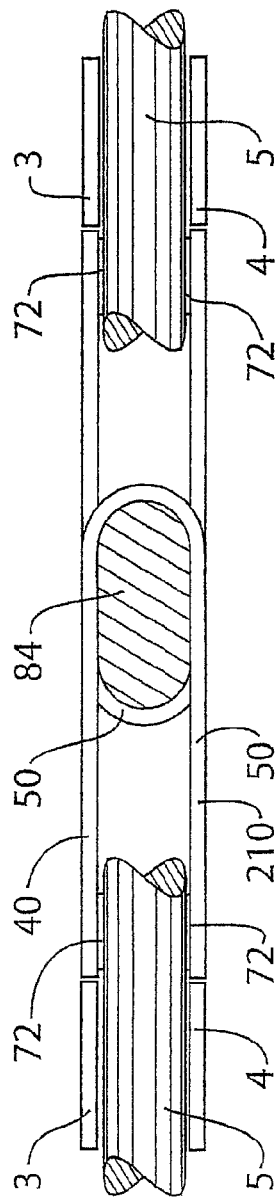
FIG. 10 is a cross-sectional view of two seaming elements in a third embodiment of the invention in a mutually connected position.

Referring now to FIG. 10, a further embodiment of the invention is shown, in which the seaming element 210 comprises a pair of body members 40 which surround and are securable to weft yarns 5, by suitable securing means such as welds 72, the weld area ending close to the adjacent upper warp yarns 3 and lower warp yarns 4. The channelled protrusions 50 in this embodiment are shown as having received an elliptical pintle 84 to secure the seaming elements 210 together.

Figure 11:
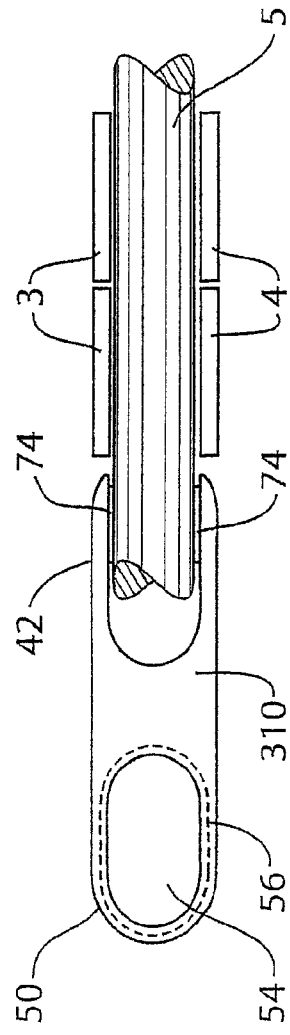
FIG. 11 is a cross-sectional view of a seaming element in a fourth embodiment of the invention secured to a fabric.

Similarly, as shown in FIG. 11, seaming element 310 comprises a body having a pair of body members 42 which surround and are securable to weft yarns 5, by suitable securing means such as welds 74, the weld area ending close to the adjacent upper warp yarns 3 and lower warp yarns 4. In this embodiment, protrusion 50 is provided with a reinforcement 56, with a configuration corresponding to that of channel 54.

For the seaming elements 210 and 310, shown in FIGS. 10 and 11 respectively, it can be seen that the preferable thickness of each of these seaming elements is substantially equal to the caliper of the finished fabric, to avoid or minimize any discontinuity or irregularity between the finished seaming area and the general fabric body.

Figure 12:
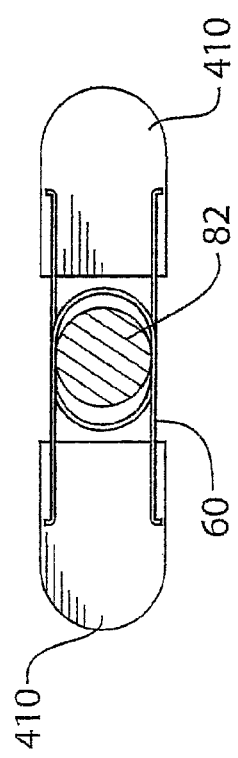
FIG. 12 is a cross-sectional view of two seaming elements in a fifth embodiment of the invention in a mutually connected position.
Figure 13:
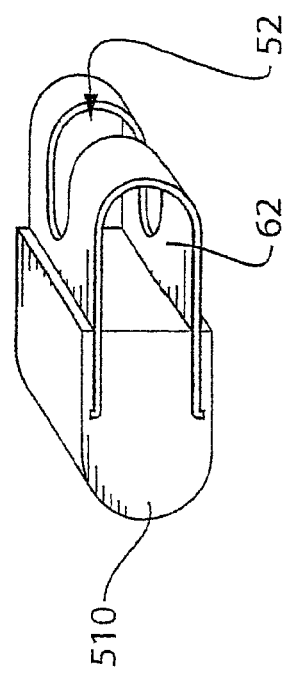
FIG. 13 is a perspective view of a seaming element of the fifth embodiment.

FIG. 12 shows a further embodiment of the invention. Seaming elements 410 are each provided with protrusions 60, partially affixed as inserts within the body of the seaming element 410. The protrusions 60 can be interdigitated and secured by a pintle such as circular cross-section pintle 82. The protrusions 60 can be of any suitable configuration which can be interdigitated. FIG. 13 shows one such configuration, in which seaming element 510 has protrusions 62 separated by notches 52.

Figure 14:
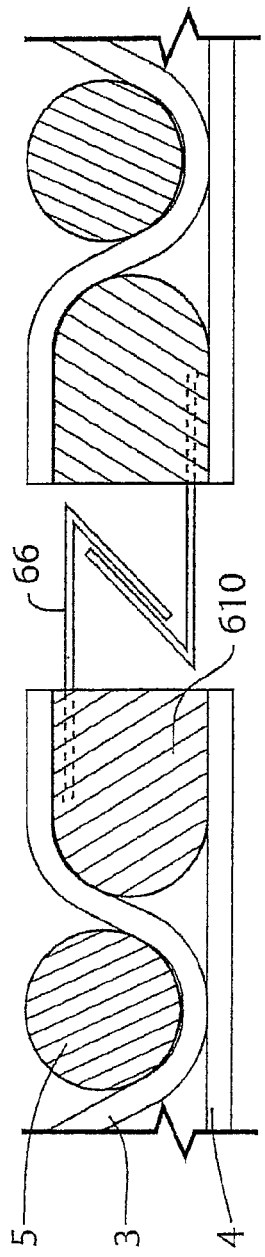
FIG. 14 is a cross-sectional view of two seaming elements of a sixth embodiment of the invention in a mutually connected position and secured to a fabric.

FIG. 14 shows a further embodiment of the invention, in which angled protrusions 66 are provided to the seaming element 610, shown here as secured between upper warp yarns 3 and lower warp yarns 4, adjacent a first weft yarn 5. The two seaming elements 610 are connected and retained together by the angular configuration of the protrusions 66.

Figure 15:
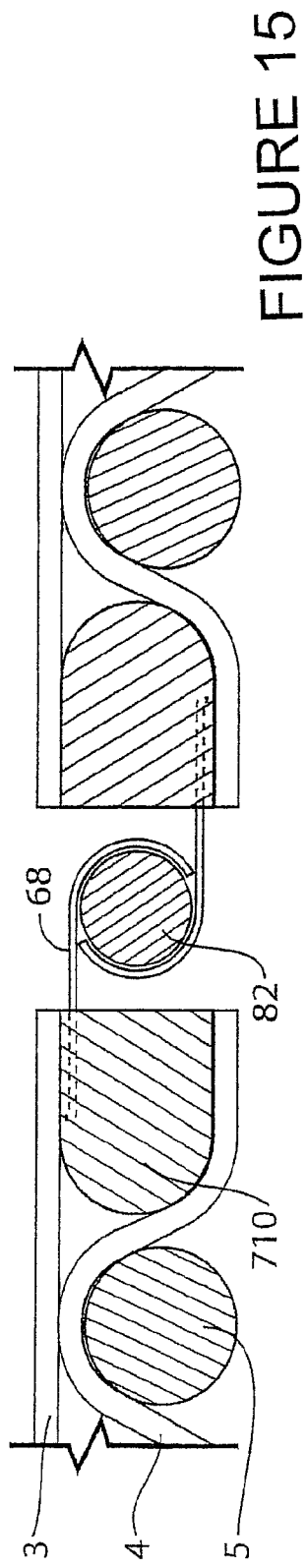
FIG. 15 is a cross-sectional view of two seaming elements of a seventh embodiment of the invention in a mutually connected position and secured to a fabric.
Figure 16:
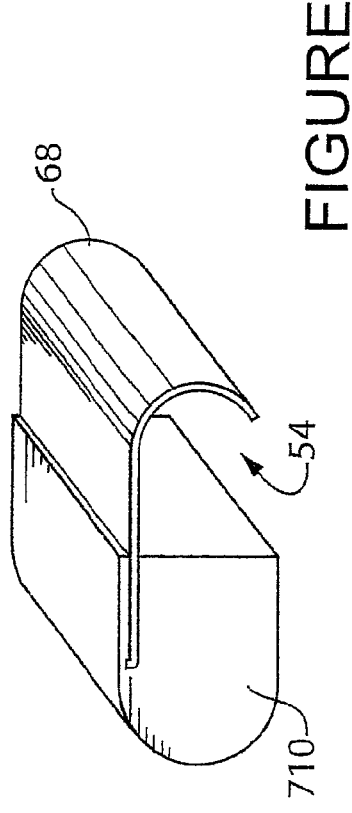
FIG. 16 is a perspective view of a seaming element of FIG. 15.

FIGS. 15 and 16 show a still further embodiment of the invention, in which the seaming elements 710 are provided with protrusions 68 defining a channel 54. The protrusions 68 are connected together and then secured in position by circular cross-section pintle 82.

Referring now to FIGS. 17 to 23, these illustrate a further embodiment of the seaming element of the invention. In each of these figures, the following features are identified and have identical numbering. The seaming element 100 has a top surface 120, a bottom surface 121, a left edge (or end) 122, a right edge/end 124, a leading edge 126 and a trailing edge 128. The seaming element 100 further includes along its leading edge 126 a plurality of protrusions 150 between which are located notches 152. The notches 152 and protrusions 150 are dimensioned such that protrusions 150 on one seaming element 100 will fit into corresponding notches 152 on a second seaming element 100, to allow the two seaming elements 100 to be joined. The notches 152 extend into the body of the seaming element 100 from the leading edge 126 towards the trailing edge 128 a sufficient distance to allow corresponding protrusions from a second seaming element to be accurately located in the desired position within these notches.

Figure 17:
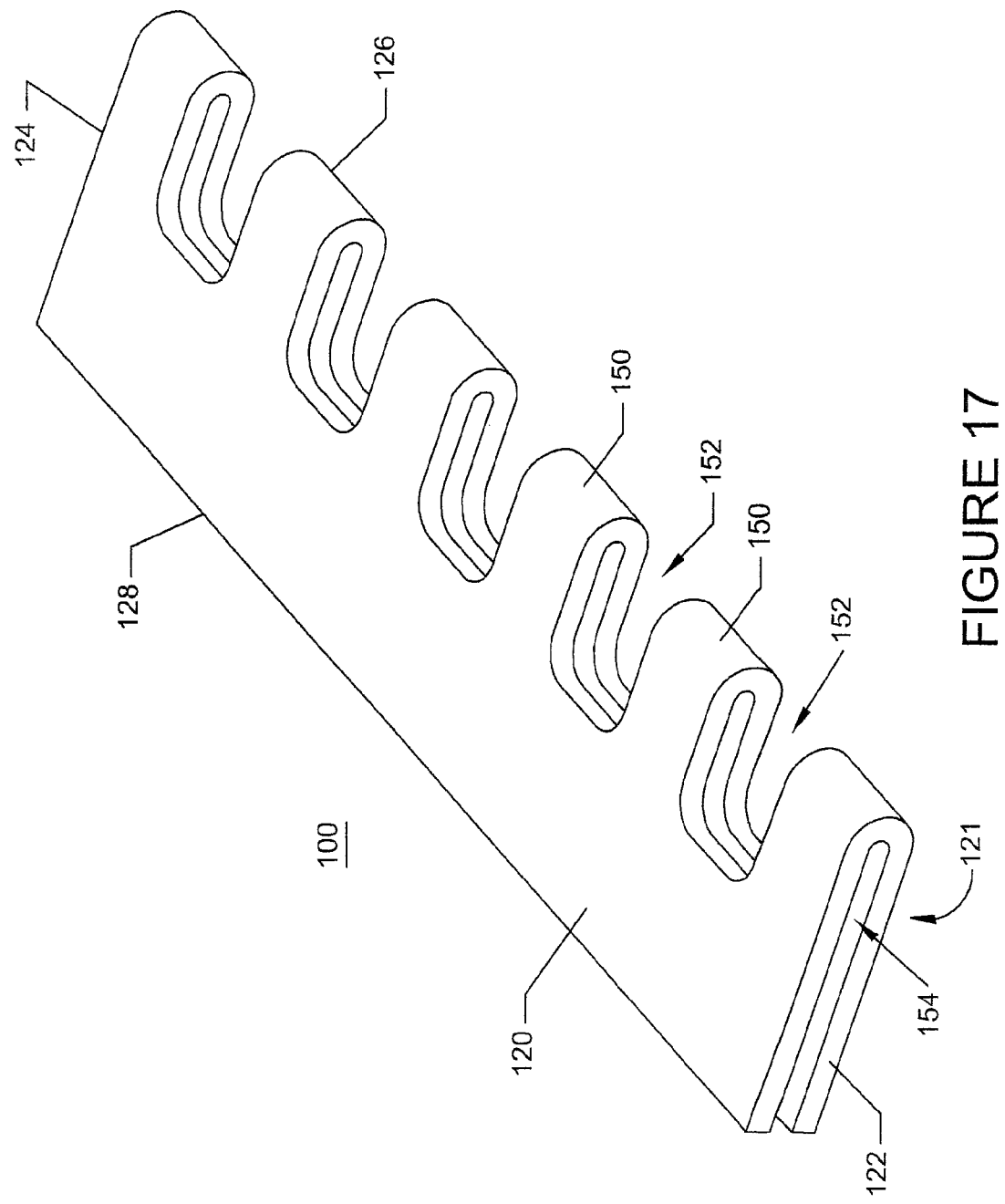
FIG. 17 is a perspective view of a seaming element of an eighth embodiment of the invention.
Figure 18:
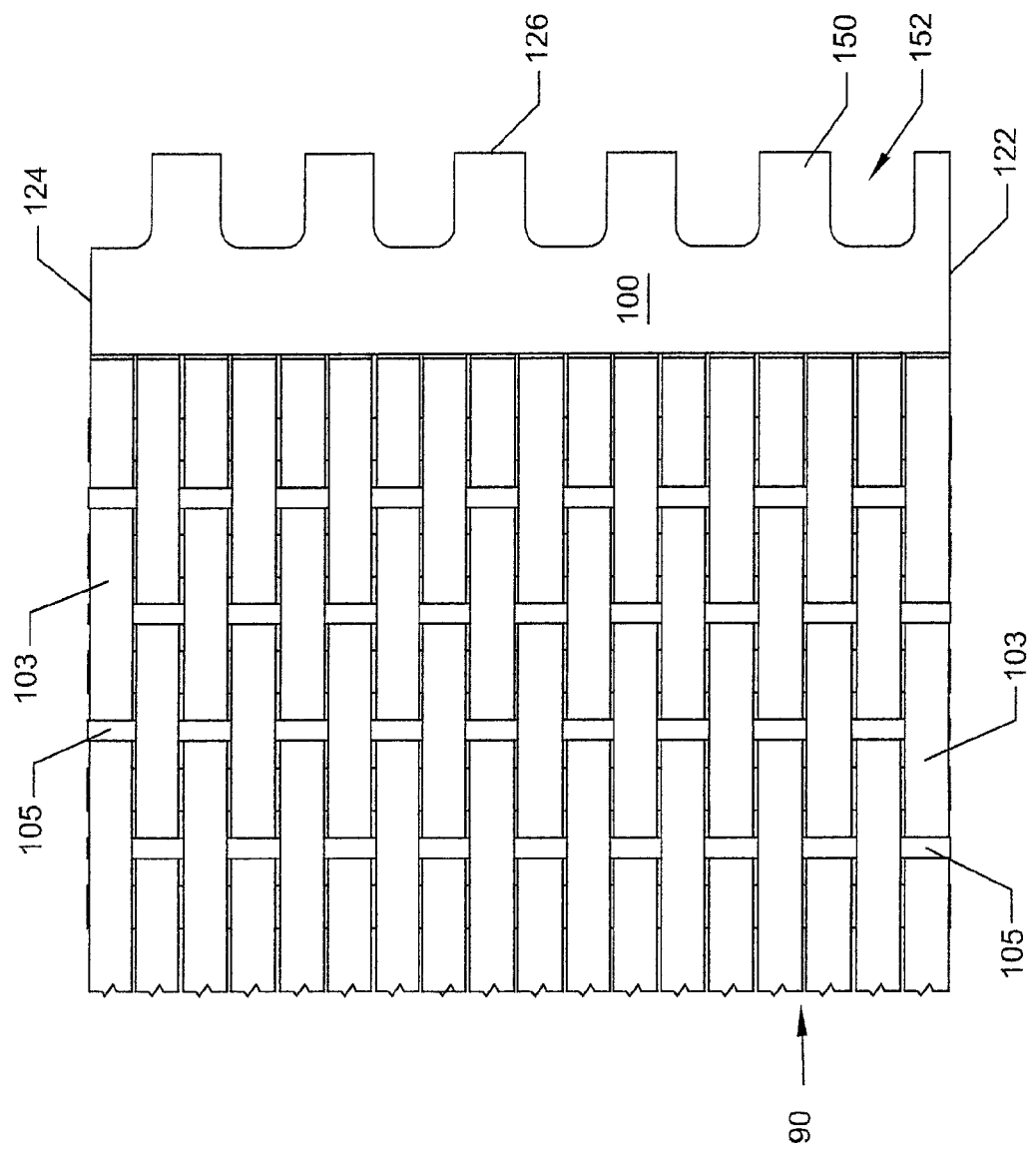
FIG. 18 is a top view of the seaming element of FIG. 17, secured to a fabric.
Figure 19:
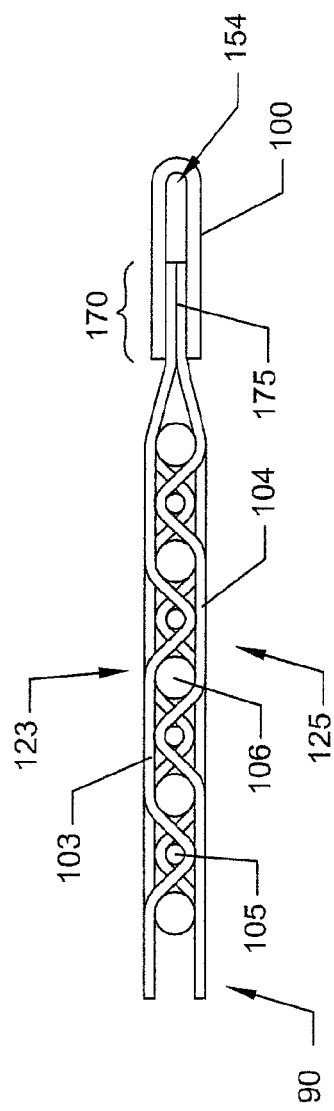
FIG. 19 is a cross-sectional side view of the seaming element of FIG. 17, secured to a fabric.

FIG. 17 is a perspective view of a seaming element 100 according to the invention, before being secured to an end or edge of a fabric to be seamed. FIG. 18 shows a top or plan view of the seaming element 100 after being attached to an end of a woven industrial fabric 90, and FIG. 19 is a cross-sectional side view of the seaming element 100 and fabric 90 of FIG. 18. The fabric 90 includes a set of first (upper) warp yarns 103, and a set of second (lower) warp yarns 104, interwoven with weft yarns, comprising (smaller) first weft yarns 105, and (larger) second weft yarns 106. The fabric 90 has a first surface 123 upon which a product may be conveyed (corresponding to surface 120 of the seaming element 100) and a second surface 125 which in use will be in contact with the various moving and stationary elements of the machine for which it is intended.

Figure 20:
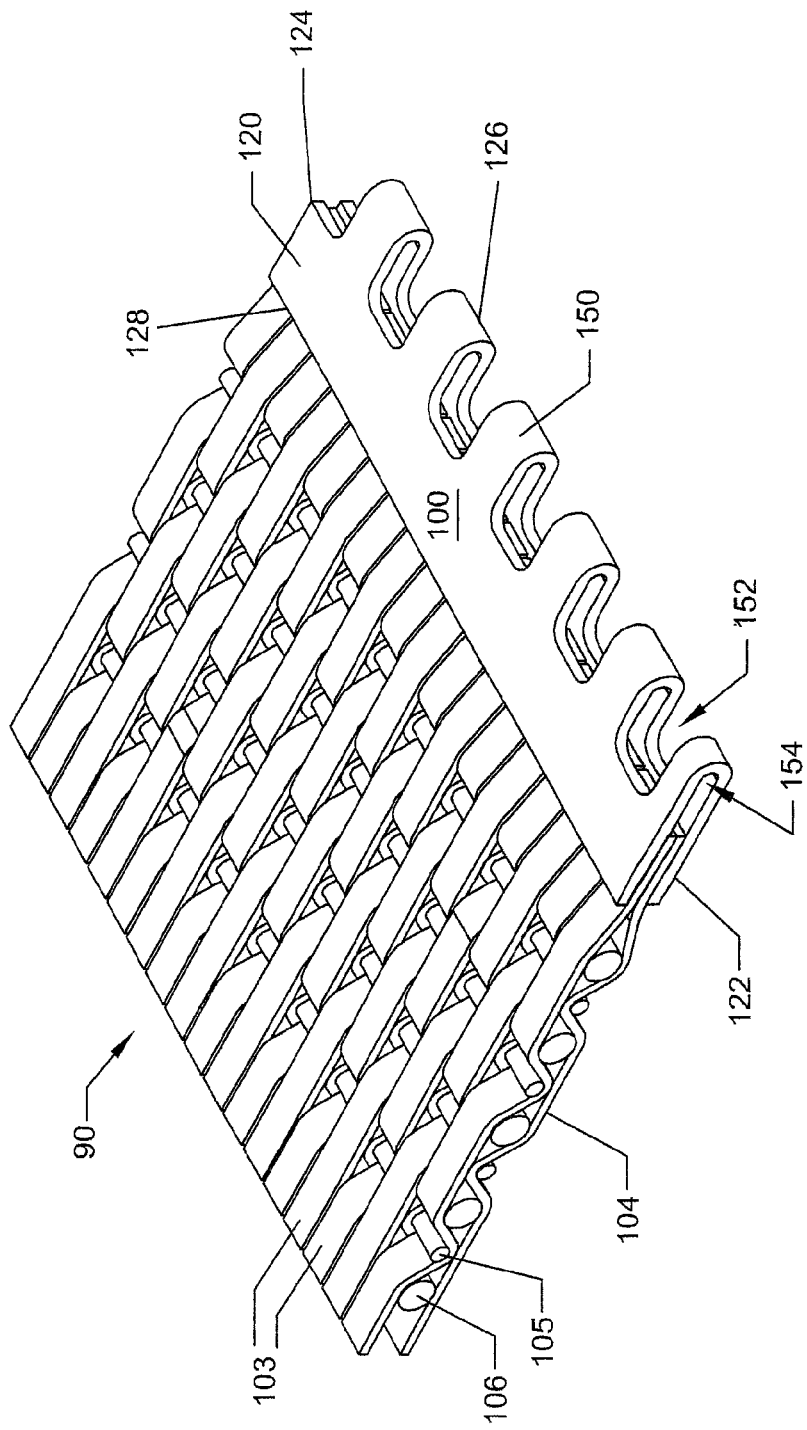
FIG. 20 is a perspective view of the seaming element and fabric end shown in FIG. 18.
Figure 21:
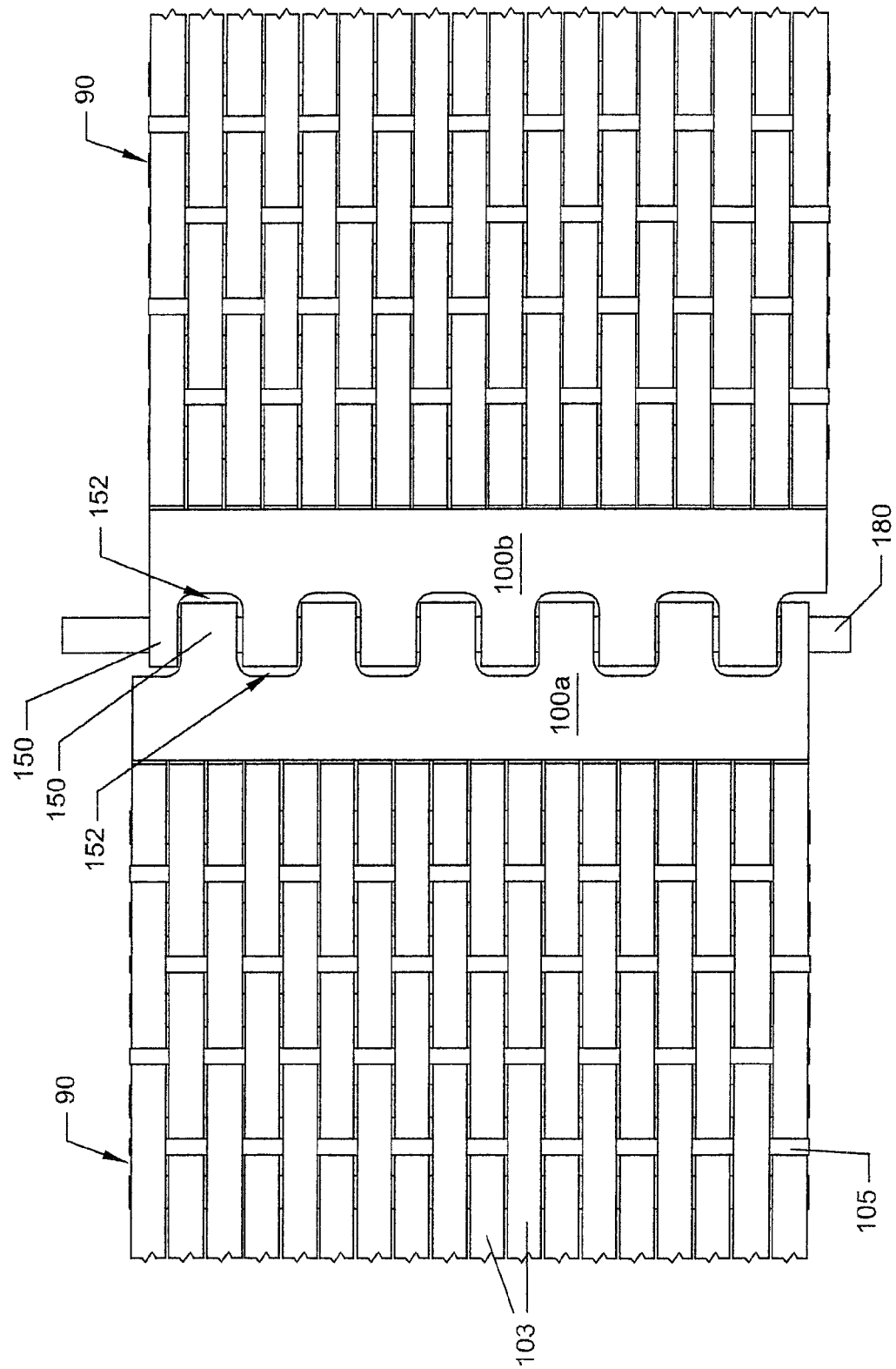
FIG. 21 is a top view showing seaming elements of the eighth embodiment of the invention in a mutually connected position and secured to a fabric.
Figure 22:
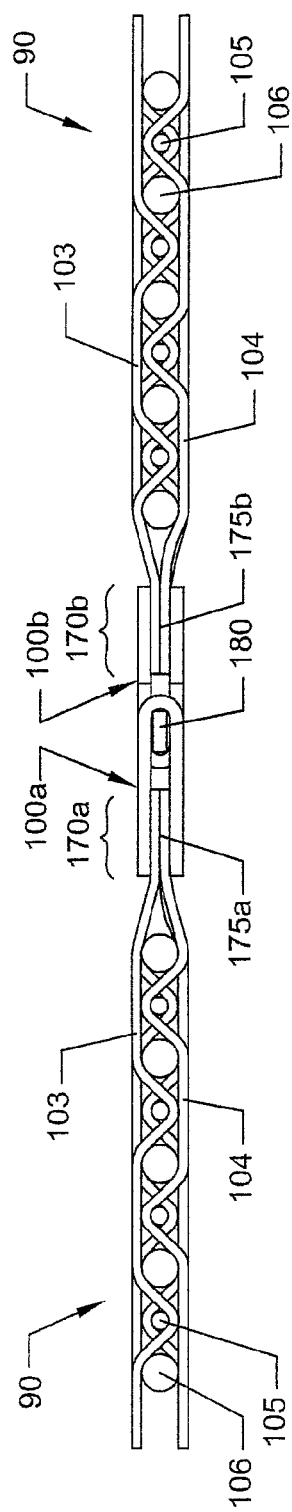
FIG. 22 is a cross-sectional side view of the two seaming elements and fabric ends shown in FIG. 21.
Figure 23:
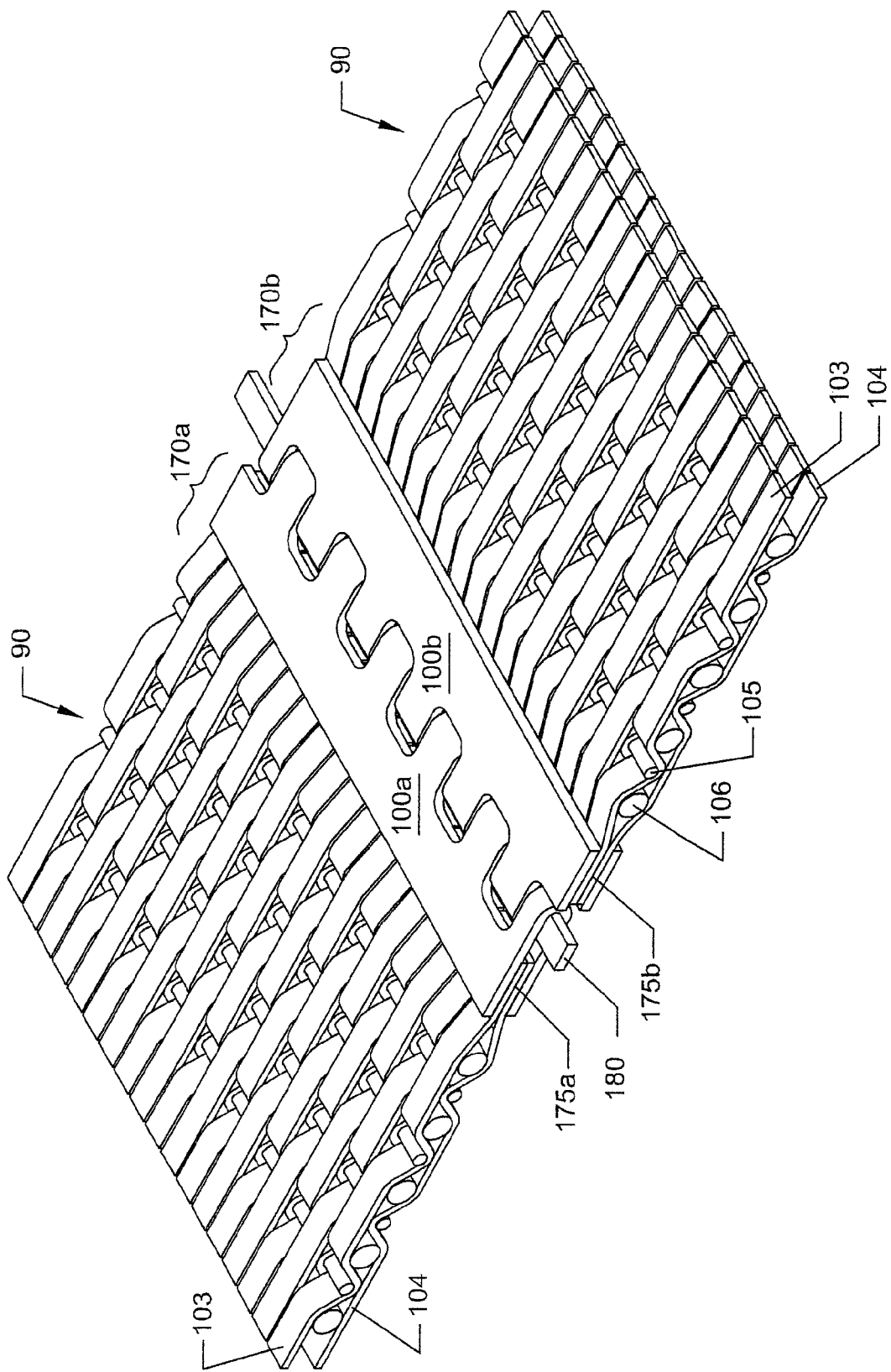
FIG. 23 is a perspective view of the two seaming elements and fabric ends shown in FIG. 21.

As shown in FIG. 19, and in the perspective view in FIG. 20, the seaming element 100 is attached to the fabric 90 by inserting the warp yarns 103 and 104 into the interior of the U-shaped seaming element 100 at an end area of the fabric where selected weft yarns 105 and 106 have been removed. The warp yarns 103, 104 can be inserted in any suitable manner, but preferably the warp yarns 103 and 104 are cut evenly along the fabric edge, and several of the weft yarns 105 and 106 are removed from the fabric 90 to produce free ends of the warp yarns 103, 104 of a desired length. Advantageously, and as shown in FIG. 19, these warp yarn free ends are then flattened and compressed to bring them together in the area 170, extending into the space within the seaming element 100 in such manner as to leave a channel 154 which is dimensioned to accept a pintle 180 as shown in FIGS. 21 to 23. The warp yarn free ends are then affixed, for example by welding or bonding, at region 175 to the seaming element 100.

Referring to FIG. 20, which is a perspective view of a seaming element 100 secured in position to one end of a fabric 90, it can be seen that the thickness or caliper of the seaming element 100 where the yarn ends of warps 103 and 104 are inserted is approximately equal to the thickness or caliper of the woven fabric 90, thus minimizing discontinuity and any consequent adverse effect on the product carried on the fabric 90. This relative thickness can also be seen more clearly in the cross-sectional view of FIG. 22 showing an assembled fabric with the seaming elements secured together, discussed below.

Referring now also to FIGS. 21 to 23, these show a pair of seaming elements 100a, 100b of the invention connected together, the protrusions 150 on each of the respective seaming elements being interdigitated, so that each protrusion 150 is within an opposing notch 152, and a pintle 180 is passed through the channels 154 (FIG. 20) in the protrusions 150, to secure the seaming elements 100a, 100b together to form the seam.

The seaming element 100 is preferably formed from a hydrolysis resistant film which is suitably cut to provide for the protrusions 150 and notches 152. Preferably the film is die cut as a flat film, so as to create the protrusions 150 and notches 152. Then the flat film is deformed under heat and pressure into the shape of a U, which can be interdigitated with the protrusions 152 and notches 152 of a corresponding seaming element 100 for connection together by a seaming device such as pintle 180. As noted above, where the bonding is effected by welding, the film should be of a material which is compatible with the yarns to which it will be welded. PET film is particularly suitable as it can be laser welded to PET yarns. However, a greater variety of materials is suitable where the bonding is to be effected by adhesives. As noted above, thermoset films comprised of polyimides such as are sold in the marketplace under the tradenames Apical™, Kapton™, UPILEX™, VTEC PI™, Norton TH™, Kaptrex™ and the like may be suitable for this purpose.

In this embodiment, the seaming element 100 is bonded to the cut ends of the warp yarns 103 and 104 by any suitable means, but preferably by focused laser energy applied to both sides of the seaming element 100 along its length proximate the area 175, where the yarn ends have been compressed as at 170. Application of focused laser energy at this location will fuse or weld the seaming element 100 to the yarns 103 and 104 without causing appreciable loss of yarn properties. This will provide a seam strength which is sufficient for most applications. The weld is effected by providing a laser energy absorbing coating to either or both the surface of the interior of the seaming element 100 and the surfaces of the ends of the warp yarn 103 and 104. Most polymeric materials do not absorb laser energy and, if such a coating is not supplied, the laser energy may either be insufficient to create the necessary weld, or will cause over-melting and/or loss of molecular orientation where the laser energy is focused on the yarns 103 and 104 of the fabric. It has been found that a suitable laser energy absorbing coating for this purpose is Clearweld LD140 available from Gentex Corp. of Simpson, Pa. The coating may be applied to the yarn ends as a liquid by dipping, brushing, spray or by other similar means. The coating is also available as a film which can be inserted into the U-shaped channel 154 of the seaming element 100, or over the ends of the warp yarns 103 and 104 prior to installation of the seaming element 100.

In FIGS. 22 and 23, the pintle 180 is shown as rectangular in cross-section, and will have dimensions compatible with the configuration and dimensions of the seaming element 100, the width in the direction of the eventual machine direction plane of the fabric 90 being typically at least three times the height. However, the pintle 180 can have any suitable cross-sectional shape, such as circular or generally oval, provided that it has sufficient strength to resist shear caused by any longitudinal tension placed on the fabric. The pintle 180 is preferably formed of a hydrolysis resistant material such as a PET which has been hydrolysis stabilized in a manner known in the art. However, the pintle 180 could be formed of various materials depending on the intended end use of the fabric, including PEEK, PPS, nylons or a metal such as stainless steel.

The surface 120 of the seaming element could be embossed or otherwise profiled if advantageous depending on the intended end use of the fabric, for example to increase contact point density between the seaming element and the product conveyed on the fabric. As a further alternative, the exterior surface of the seaming element can be embossed with small striations or otherwise profiled, so as to maintain continuity with the yarn surfaces of the fabric to which the seaming element is to be attached, for example where the fabric contains yarns profiled in the manner described in U.S. Pat. No. 6,773,786 (Kuckart). The surface may also be provided with a chemical treatment such as Teflon® or other contamination resistant treatment.

Figure 24:
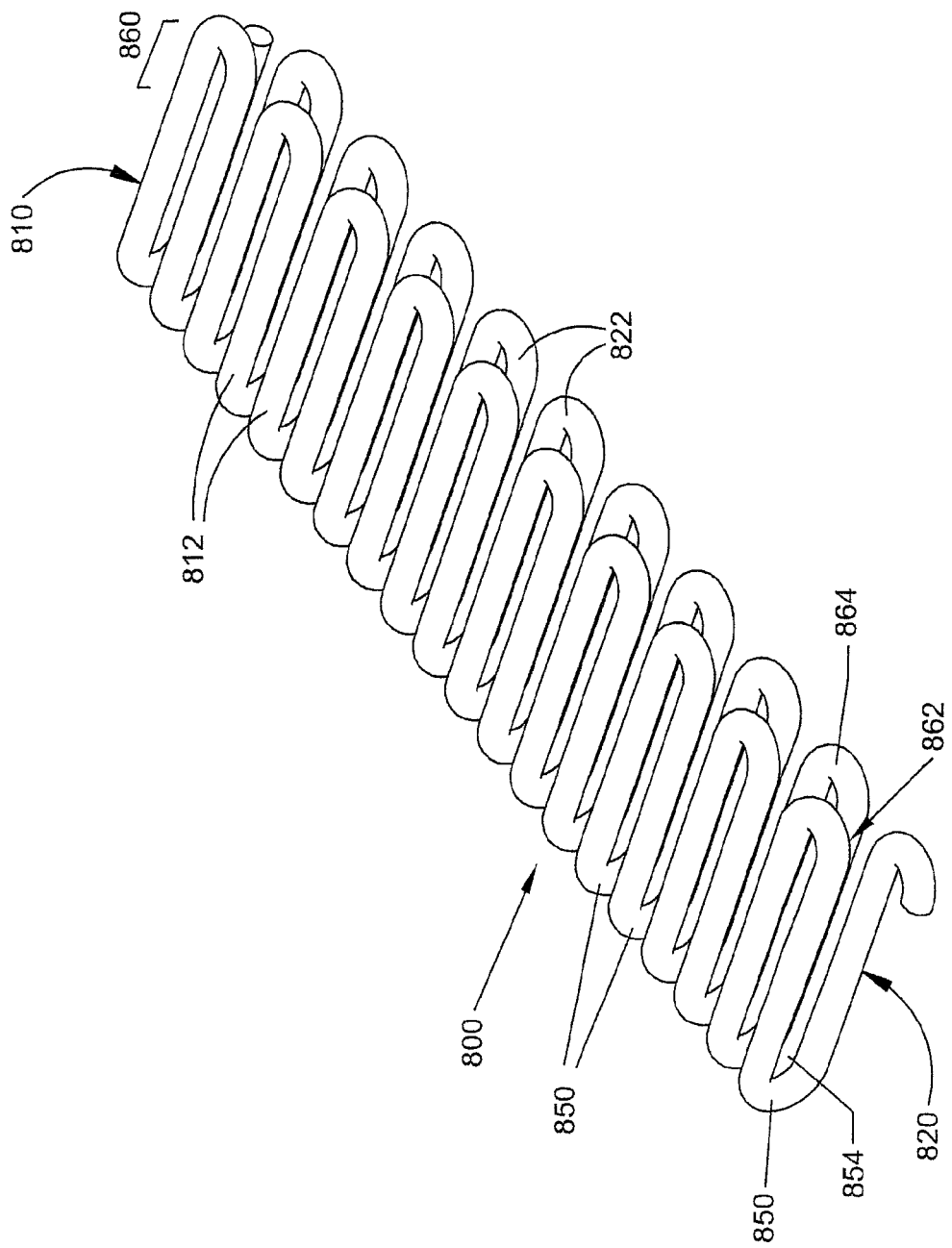
FIG. 24 is a perspective view of a seaming element of a ninth embodiment of the invention.
Figure 25:
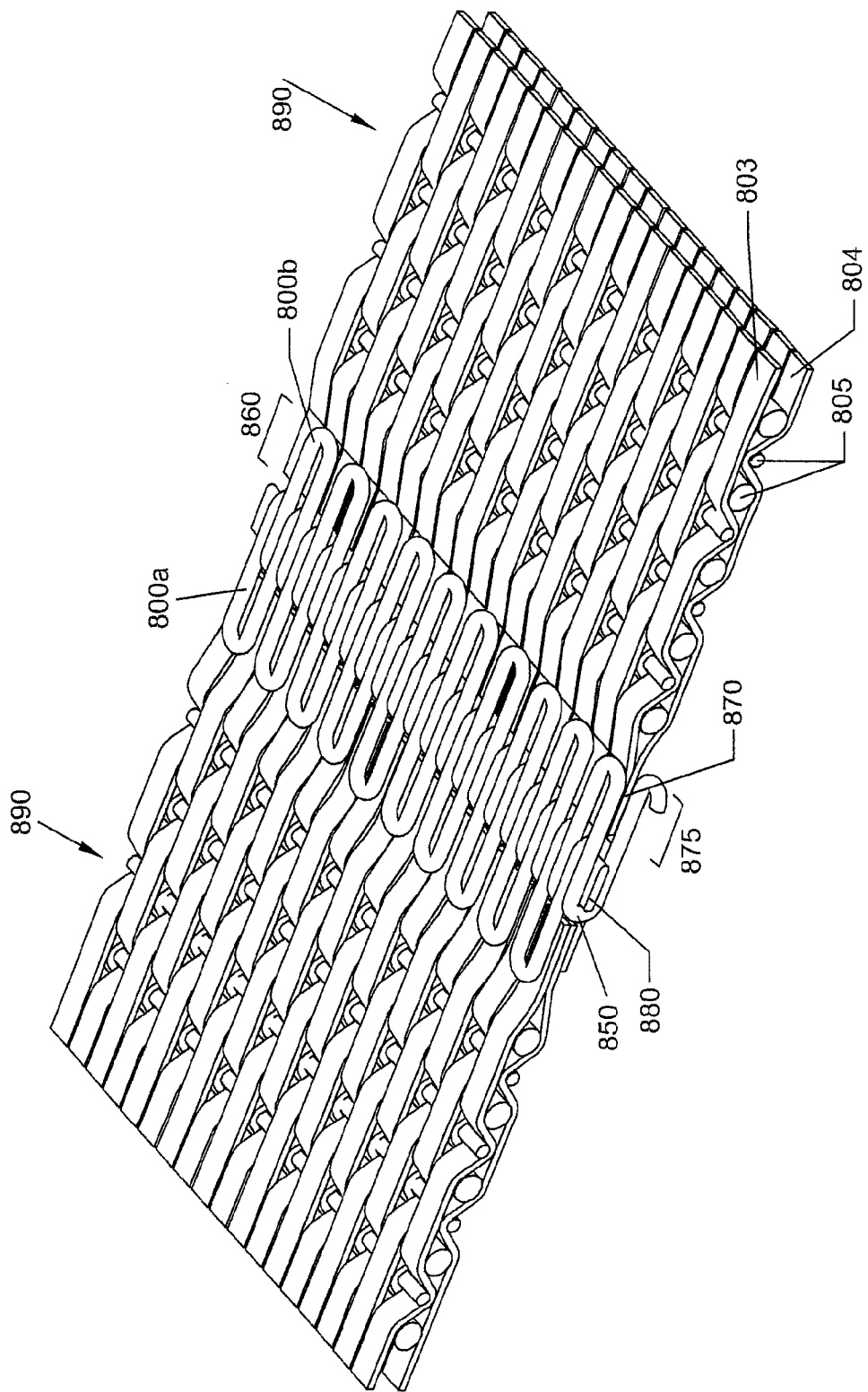
FIG. 25 is a perspective view of two seaming elements of the ninth embodiment of the invention in a mutually connected position and secured to a fabric.

Referring now to FIGS. 24 and 25, a ninth embodiment of a seaming element 800 of the invention is shown. As shown in FIG. 24, the seaming element 800 comprises a continuous filamentary structure which is deformedly set in a configuration to form a plurality of looped segments, aligned as a first layer 810 of segments 812 and a second layer 820 of segments 822, each segment 812 being connected to each adjacent segment 822 by a connecting portion 850, forming a seaming element having a substantially U shaped cross-section. In FIG. 25, a pair of seaming elements 800a, 800b is shown installed at respective first and second seamable edges of a fabric 890, woven from a first layer of warp yarns 803, a second layer of warp yarns 804, and a set of weft yarns 805. At an area 870 where the warp yarns 803, 804 have been compressed together into a flattened position, opposing surfaces 862 and 864 (FIG. 24) of body portion 860 of the element 800a are secured by bonding to the respective outer surfaces of the warp yarns 803, 804, to form a bonded region 875, the connecting portions 850 thus protruding from the bonded region 875 as a plurality of U shaped loops. Similarly, seaming element 800b is bonded to the other seamable edge of the fabric 890. The sets of connecting portions 850 on each of seaming elements 800a, 800b can thus be brought into engagement together, thereby defining a channel 854 (FIG. 24) which can receive a pintle 880, as shown in FIG. 25, to secure the two seamable edges to each other.

Figure 26:
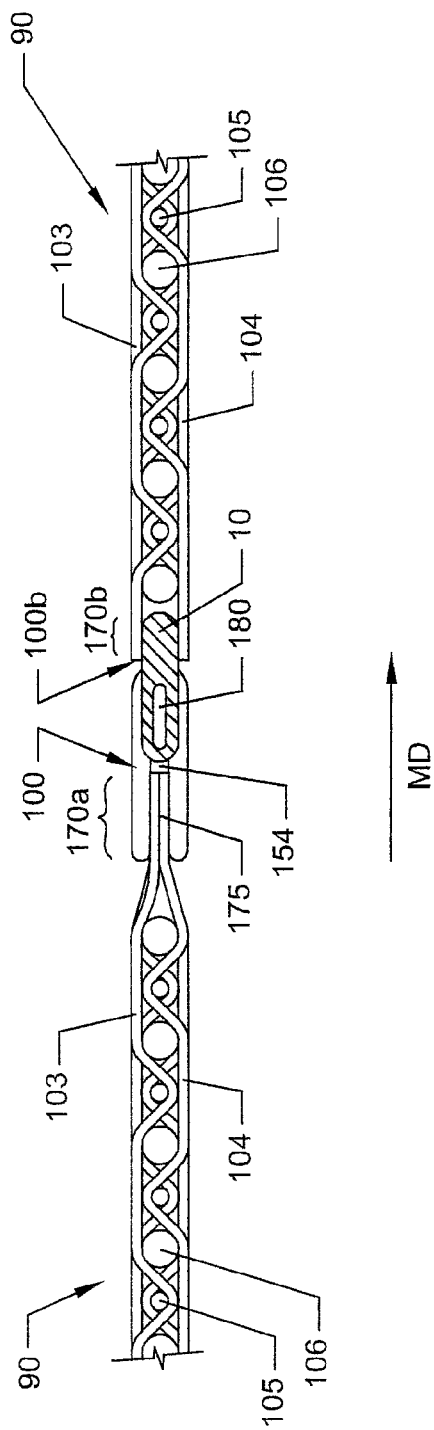
FIG. 26 is a cross-sectional side view of two complementary seaming elements having different configurations, and secured to each other and to fabric ends.

Referring now to FIG. 26, this is a cross-sectional view showing the use of seaming elements having different but complementary configurations, secured together in an embodiment of the invention. Fabric 90 is a woven fabric comprising warp yarns 103, 104, woven with weft yarns 105, 106. Referring to the right side of FIG. 26, seaming element 10, exemplifying the first embodiment of the invention (such as shown in FIG. 7), is secured to a first seamable edge of the fabric 90, by being bonded at region 170b between cut ends of warp yarns 103, 104. At the left side of FIG. 26, seaming element 100, exemplifying the eighth embodiment of the invention (such as shown in FIG. 17), is secured to the second seamable edge of the fabric 90, by being bonded at region 170a to the outside surfaces of warp yarns 103, 104, which are compressed at flattened area 175, and inserted into channel 154. The two seaming elements are brought into alignment together to form a channel into which pintle 180 is inserted to secure the seaming elements in their engaged position and secure the seam.

It can readily be seen from FIG. 26 that by the appropriate selection of dimensions for the two seaming elements 10 and 100, having regard to the caliper of the fabric 90, the outer surfaces of the seaming element 100 can be substantially aligned with the upper and lower surfaces of the fabric 90, thus reducing or avoiding any discontinuity or any variations in caliper, and the resulting disadvantages in relation to quality of the sheet being carried on the fabric 90. At the same time, this arrangement of the seaming elements, in particular having regard to the continuity between the cut ends of the warp yarns and the leading edge of seaming element 100 at and following bonded region 170b, avoids the presentation of any sudden protrusions above or below the running surface of the fabric, which might be subject to increased impact and wear from the machine components as the fabric moves in the direction indicated by the arrow MD. Similarly, the substantial continuity and consistency of caliper between the trailing edge of seaming element 100 and the following warp yarns 103, 104 is sufficient to avoid any adverse effect on the sheet being carried by the fabric 90.

Figure 27:
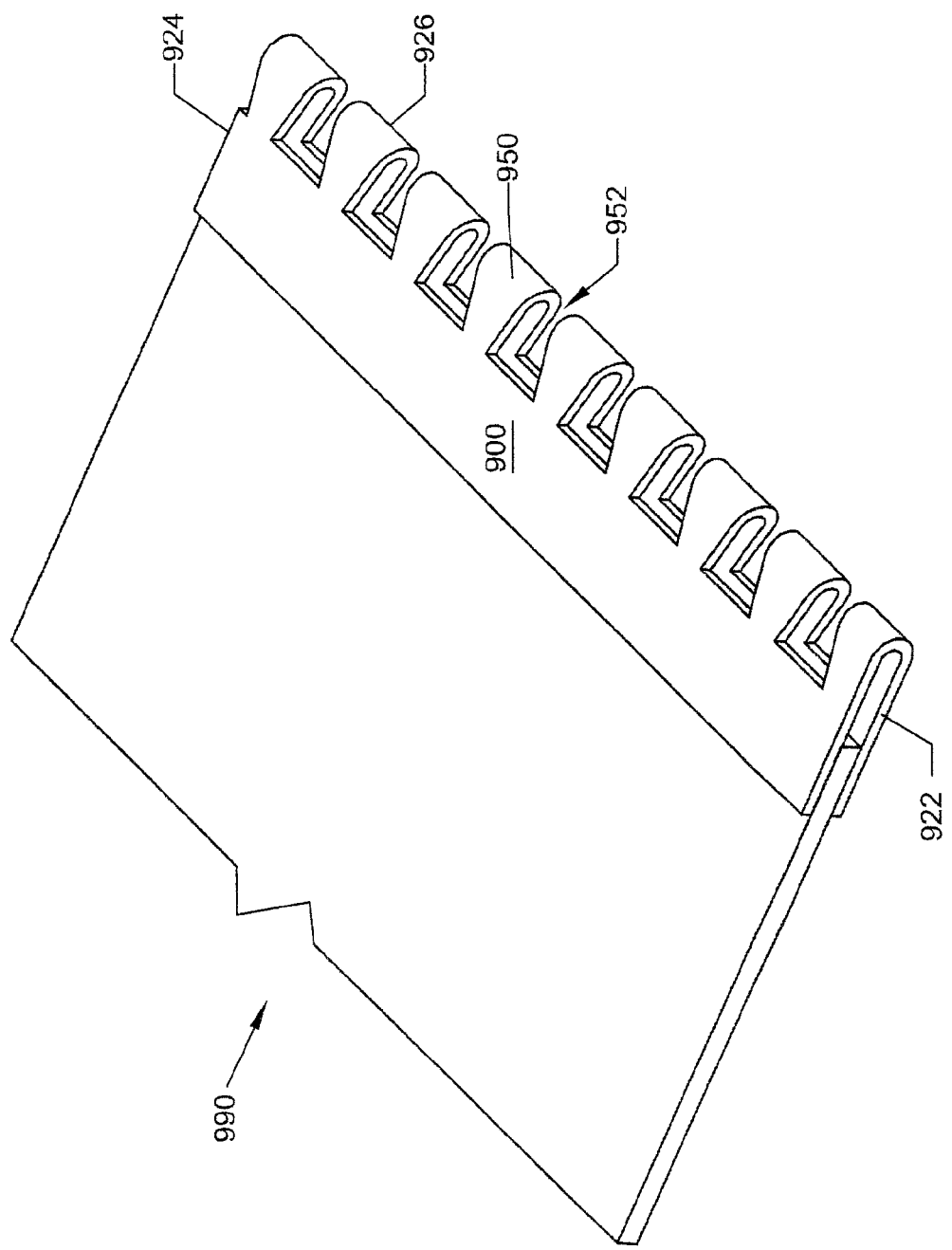
FIG. 27 is a top view showing a seaming element of a tenth embodiment of the invention.

FIG. 27 is a top view showing a seaming element of a tenth embodiment of the invention. In this embodiment, seaming element 900 is configured to be secured to the outer surfaces of the fabric 990, which is shown here as a non-woven fabric not having yarns, and can comprise one or more layers of a film or similar material. This embodiment has a similar configuration to the embodiment shown in FIGS. 21 to 23, but the protrusions 950 are tapered inwards from the first lateral edge region 926 towards the body of the seaming element 900, and the notches 952 are correspondingly tapered inwards towards the outer edge of the first lateral edge region 926. This configuration allows for a pair of seaming elements 900 to be securely engaged, for example by bringing the first lateral edge region of the first seaming element 900 over the corresponding first lateral edge region of the second seaming element 900 of the pair, such that after alignment of the opposing protrusions 950 and notches 952, the two seaming elements may be secured together by a securing means such as a pintle. However, for some applications, the configuration of the opposing protrusions and their interlocking engagement may provide sufficient securing of the seaming elements without the need for a further securing means such as a pintle.

In the Figures, most of the embodiments of the seaming element of the invention are shown as being secured to woven fabrics, or fabrics which are constructed of yarns, but not interwoven. However, for each of the embodiments in which the seaming element is configured to be secured to outer surfaces of a fabric, i.e. not between sets of yarns, there is a large variety of possible combinations of fabric and seaming element, in that a fabric to be enclosed within the body portion of a seaming element can be of any construction, including a fabric constructed of a film or similar material, such as shown in FIG. 27.

The invention claimed is:

1. A seamed industrial textile, comprising:
an industrial textile having a first seamable edge, a second seamable edge, a first substantially planar outer surface, and a second substantially planar outer surface; and
a first seaming element and a second seaming element together joining the first seamable edge and the second seamable edge, each of the first and second seaming elements including:
an elongate body having a first end, a second end, a first lateral edge region, and a second lateral edge region, the second lateral edge region having an inner surface, the elongate body of each of the first and second seaming elements having optical properties so as to be transparent to an incident laser energy/radiation and comprising a laser-weldable polymeric film on at least a portion of the inner surface of the second lateral edge region, the layer of laser-weldable polymeric film being laser energy absorbent, the layer of laser-weldable polymeric film being laser welded to the first and second substantially planar outer surfaces proximate the first seamable edge, the layer of laser-weldable polymeric film of the second seaming element being laser welded to the first and second substantially planar outer surfaces proximate the second seamable edge,
each of the first lateral edge regions having at least one extension member that defines a longitudinal channel before the first end and the second end, the at least one extension member of the first seaming element extending from the first seamable edge and the at least one extension member of the second seaming element extending from the second seamable edge,
the at least one extension member of the first seaming element being engaged with the corresponding at least one extension member of the second seaming element such that the extension members are securably aligned together.

2. The seamed industrial textile according to claim 1, wherein the industrial textile is a woven industrial textile, the industrial textile including at least one layer of yarns, the first seaming element being laser welded to surfaces of the yarns at and proximate the first seamable edge, and the second seaming element being laser welded to surfaces of the yarns at and proximate the second seamable edge.

3. The seamed industrial textile according to claim 1, wherein the longitudinal channel comprises a plurality of alternating protrusions and notches.

4. A seamed nonwoven industrial textile, comprising:
a nonwoven industrial textile having a first seamable edge, a second seamable edge, a first substantially planar outer surface, and a second substantially planar outer surface; and
a first seaming element and a second seaming element together joining the first seamable edge and the second seamable edge, each of the first and second seaming elements including:
an elongate body having a first end, a second end, a first lateral edge region, and a second lateral edge region, the second lateral edge region having an inner surface; and
at least one channelled protrusion along the first lateral edge region,
the elongate body of each the first and second seaming elements having optical properties so as to be transparent to an incident laser energy/radiation and comprising a laser-weldable polymeric film on at least a portion of the inner surface of the second lateral edge region, the layer of laser-weldable polymeric film being laser energy absorbent, the layer of laser-weldable polymeric film being laser welded to the first and second substantially planar outer surfaces proximate the first seamable edge, the layer of laser-weldable polymeric film of the second seaming element being laser welded to the first and second substantially planar outer surfaces proximate the second seamable edge,
the at least one channelled protrusion of the first seaming element being engaged with the corresponding at least one channelled of the second seaming element such that the protrusions are securably aligned together.

5. A seamed woven industrial textile, comprising:
a woven industrial textile having sets of interwoven yarns defining a first seamable edge, a second seamable edge; and
a first seaming element and a second seaming element together joining the first seamable edge and the second seamable edge, each of the first and second seaming elements including:
a U-shaped elongate body having a first end, a second end, a first lateral edge region, and a second lateral edge region, the second lateral edge region having an inner surface; and
at least one channelled protrusion along the first lateral edge region,
the U-shaped elongate body having optical properties so as to be transparent to an incident laser energy/radiation and an inner surface and comprising a laser-weldable polymeric film on at least a portion of the inner surface of the second lateral edge region, the layer of laser-weldable polymeric film being laser energy absorbent, the inner surface second lateral edge region of the first seaming element being laser welded to the outer surfaces of the first seamable edge, the inner surface second lateral edge region of the second seaming element being laser welded to the outer surfaces of the second seamable edge, and the at least one channelled protrusion of the first seaming element being engaged with the corresponding at least one channelled of the second seaming element, such that the protrusions are securably aligned together.

6. The seamed woven industrial textile according to claim 5, wherein the seaming element is laser welded to outer surfaces of free ends of the yarns at the first and second seamable edges.

7. The seamed industrial textile according to claim 1, further comprising a plurality of notches along the first lateral edge region and penetrating into the longitudinal channel, wherein
(i) the notches define the at least one channelled protrusion as a plurality of spaced-apart channelled protrusions;
(ii) the protrusions are engageable with protrusions of the corresponding seaming element by interdigitation to define a channel constructed and arranged to receive a seam securing means.

8. The seamed industrial textile according to claim 1, wherein the longitudinal channel is constructed and arranged to receive a pintle having a cross-sectional shape selected from circular, elliptical and rectangular.

9. The seamed industrial textile according to claim 1, wherein the layer of laser-weldable polymeric film comprises a thermoplastic material.

10. The seamed industrial textile according to claim 9, wherein the thermoplastic material is PET.

11. The seamed industrial textile according to claim 1, wherein at least one of the first and second ends comprises an enhanced wear-resistant region.

12. The seamed industrial textile according to claim 11, wherein the enhanced wear-resistant region comprises at least one of a reinforcement material, a secondary material, and an extension member.

13. The seamed industrial textile according to claim 1, wherein at least part of an outer surface of the seaming element is profiled.

14. The seamed industrial textile according to claim 13, wherein the profiled surface comprises embossing.

15. The industrial textile according to claim 1, wherein each of the first and second seaming elements has the same configuration as each other.

16. The industrial textile according to claim 1, wherein one of the first and second seaming elements provided to the first seamable edge of the textile has a first configuration, and one of the first and second seaming elements provided to the second seamable edge of the textile has a second configuration which is different from the first configuration.

17. The industrial textile according to claim 1, wherein the industrial textile is a woven or nonwoven industrial textile, and the seaming elements are constructed and arranged to be secured by a pintle having a cross-sectional shape selected from circular, elliptical and rectangular, and constructed of a material selected from PET, PEN, PEEK, PPS, nylon and stainless steel.

18. The industrial textile according to claim 1, wherein the industrial textile is a woven or nonwoven industrial textile, and is a papermakers fabric.

19. The industrial textile according to claim 1, wherein the industrial textile is a woven or nonwoven industrial textile, and each seaming element is provided in a machine direction of the fabric.

20. The industrial textile according to claim 1, wherein the industrial textile is a woven or nonwoven industrial textile, and each seaming element is provided in a cross-machine direction of the fabric.

21. A seaming element being configured to be laser welded to and joining a first seamable edge of an industrial textile to a second seamable edge of the industrial textile, the seaming element comprising:
a U-shaped elongate body having a first end, a second end, a first lateral edge region, and a second lateral edge region, the second lateral edge region including a first inner surface and a second inner surface,
the first lateral edge region including at least one extension member that defines a longitudinal channel between the first end and the second end and is configured to extends from the first seamable edge,
the U-shaped elongate body having optical properties so as to be transparent to an incident laser energy/radiation and at least a portion of each of the first and second inner surfaces of the U-shaped body including at least one layer of a laser-weldable polymeric film, the layer of laser-weldable polymeric film being laser energy absorbent that provides a laser-weldable interface between the seaming element and the industrial textile, the seaming element being configured to enclose and be laser welded to the first seamable edge; and
the at least one extension member being engagable with a corresponding at least one extension member of a complementary seaming element being configured to be laser welded to the second seamable edge, such that the extension members are securably aligned together.

22. The seaming element according to claim 21, wherein the industrial textile is a woven industrial textile including at least one layer, each of the at least one layer having one layer of yarns, and the seaming element is constructed and arranged to be laser welded to surfaces of the yarns at and proximate the first seamable edge.

23. The seaming element according to claim 22, wherein the longitudinal channel comprises a plurality of alternating protrusions and notches.

24. The seaming element according to claim 21, wherein the seaming element is constructed and arranged to be laser welded to outer surfaces of free ends of the yarns.

25. The seaming element according to claim 21, further comprising a plurality of notches along the first lateral edge region and penetrating into the longitudinal channel, wherein (i) the notches define the at least one channelled protrusion as a plurality of spaced-apart channelled protrusions; and (ii) the protrusions are engageable with protrusions of the corresponding seaming element by interdigitation to define a channel constructed and arranged to receive a seam securing means.

26. The seaming element according to claim 21, wherein the longitudinal channel is constructed and arranged to receive a pintle having a cross-sectional shape selected from circular, elliptical and rectangular.

27. The seaming element according to claim 21, wherein the seaming element is constructed and arranged to be welded to the industrial textile adjacent to a plurality of other seaming elements, at least one of the first and second ends including at least one fastening means.

28. The seaming element according to claim 21, wherein the at least one layer of laser-weldable polymeric film comprises a thermoplastic.

29. The seaming element according to claim 28, wherein the thermoplastic material is PET.

30. The seaming element according to claim 21, wherein at least one of the first and second ends comprises an enhanced wear-resistant region.

31. The seaming element according to claim 30, wherein the enhanced wear-resistant region comprises at least one of a reinforcement material, a secondary material, and an extension member.

32. The seaming element according to claim 21, wherein at least part of an outer surface of the seaming element is profiled.

33. The seaming element according to claim 32, wherein the profiled surface comprises embossing.

34. An industrial textile comprising a plurality of seaming elements according to claim 21.

35. The industrial textile according to claim 34, wherein each of the plurality of seaming elements has the same configuration as each other.

36. The industrial textile according to claim 34, wherein each of the plurality of seaming elements provided to the first seamable edge of the textile has a first configuration, and each of the plurality of seaming elements provided to the second seamable edge of the textile has a second configuration which is different from the first configuration.

37. An industrial textile comprising a pair of seaming elements according to claim 21.

38. The industrial textile according to claim 37, wherein each of the pair of seaming elements has the same configuration as each other.

39. The industrial textile according to claim 37, wherein each of the pair of seaming elements has a different configuration from each other.

40. The industrial textile according to claim 37, wherein the industrial textile is a woven or nonwoven industrial textile, and the seaming elements are constructed and arranged to be secured to each other by a pintle having a cross-sectional shape selected from circular, elliptical and rectangular, and constructed of a material selected from PET, PEN, PEEK, PPS, nylon and stainless steel.

41. The industrial textile according to claim 37, wherein the industrial textile is a woven or nonwoven industrial textile, and is a papermakers fabric.

42. The industrial textile according to claim 37, wherein the industrial textile is a woven or nonwoven industrial textile, and each seaming element is provided in a machine direction of the fabric.

43. The industrial textile according to claim 37, wherein the industrial textile is a woven or nonwoven industrial textile, and each seaming element is provided in a cross-machine direction of the fabric.

* * * * *